US009369394B2

(12) United States Patent
Ludwig et al.

(10) Patent No.: US 9,369,394 B2
(45) Date of Patent: Jun. 14, 2016

(54) USER PLANE TRAFFIC HANDLING USING NETWORK ADDRESS TRANSLATION AND REQUEST REDIRECTION

(71) Applicant: Telefonaktiebolaget L M Ericsson (publ), Stockholm (SE)

(72) Inventors: Reiner Ludwig, Hürtgenwald (DE); Pablo Molinero Fernandez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 96 days.

(21) Appl. No.: 14/244,020

(22) Filed: Apr. 3, 2014

(65) Prior Publication Data

US 2014/0301191 A1 Oct. 9, 2014

(30) Foreign Application Priority Data

Apr. 5, 2013 (EP) ..................................... 13162525

(51) Int. Cl.
*H04L 12/26* (2006.01)
*H04L 12/851* (2013.01)
(Continued)

(52) U.S. Cl.
CPC ............ *H04L 47/2441* (2013.01); *H04L 12/66* (2013.01); *H04L 45/72* (2013.01); *H04L 45/741* (2013.01); *H04W 28/0268* (2013.01)

(58) Field of Classification Search
None
See application file for complete search history.

(56) References Cited

U.S. PATENT DOCUMENTS 6,965,599 B1 * 11/2005 Sakurai ............. H04L 29/12009
370/392
9,032,092 B1 * 5/2015 Sinn ........................ H04L 61/00
709/222

(Continued)

FOREIGN PATENT DOCUMENTS

WO    WO 2012/052065 A1    4/2012

OTHER PUBLICATIONS

European Search Report, Application No. EP 13162525.3, Jun. 14, 2013.

(Continued)

*Primary Examiner* — Michael J Moore, Jr.
(74) *Attorney, Agent, or Firm* — Myers Bigel & Sibley, P.A.

(57) ABSTRACT

For handling user plane traffic in a communication network, a NAT node (100) determines a mapping between a network address (200-*e*) of a server (200) and a replacement network (200-*i*) address matching a packet classification rule implemented in the communication network. If the NAT node (100) receives an UL data packet (403) in which a source address identifier corresponds to a network address of a user equipment (10) and a destination address identifier corresponds to the replacement network address (200-*i*), it performs NAT of the UL data packet (403) in accordance with the mapping. This is accomplished at least by modifying the destination address identifier in the UL data packet (403) to correspond to the network address (200-*e*) of the server (200). The NAT node (100) then sends the modified UL data packet (405) toward the server (200). To provide the user equipment (10) with the replacement network address (200-*i*), a further node is configured to perform redirection of a query from the user equipment (10). For example, the further node may be a Domain Name System Node (50) which is configured to resolve a Domain Name System query (401) for the network address (200-*e*) of the server (200) with the replacement network address (200-*i*).

20 Claims, 13 Drawing Sheets

(51) Int. Cl.
*H04L 12/66* (2006.01)
*H04L 12/721* (2013.01)
*H04L 12/56* (2006.01)
*H04W 28/02* (2009.01)

(56) References Cited

U.S. PATENT DOCUMENTS

| | | | | |
|---|---|---|---|---|
| 2004/0139227 A1* | 7/2004 | Takeda | ............... | H04L 29/12066 709/245 |
| 2006/0251088 A1* | 11/2006 | Thubert | ............... | H04L 12/2898 370/401 |
| 2007/0022289 A1* | 1/2007 | Alt | ....................... | H04L 63/0272 713/168 |
| 2008/0175251 A1 | 7/2008 | Oouchi et al. | | |
| 2009/0028063 A1 | 1/2009 | Chang et al. | | |
| 2010/0183006 A1 | 7/2010 | Iwai et al. | | |
| 2011/0060838 A1* | 3/2011 | Yeung | ............... | H04L 29/12066 709/228 |
| 2013/0097329 A1* | 4/2013 | Alex | ................... | H04L 61/2567 709/228 |

OTHER PUBLICATIONS

Cotton et al., "Special Use IPv4 Addresses", Internet Engineering Task Force (IETF), Request for Comments: 5735, Jan. 2010, 11 pp.

Hinden et al., "Unique Local IPv6 Unicast Addresses", Internet Engineering Task Force (IETF), Network Working Group, Request for Comments; 4193, Oct. 2005, 16 pp.

Internet Engineering Task Force (IETF), "Transmission Control Protocol—DARPA Internet Program Protocol Specification", Sep. 1981, 66 pp.

Rekhter et al., "Address Allocation for Private Internets", Internet Engineering Task Force (IETF), Network Working Group, Request for Comments: 1918, Feb. 1996, 9 pp.

3GPP, Technical Specification, "3rd Generation Partnership Project; Technical Specification Group Core Network and Terminals; Non-Access-Stratum (NAS) protocol for Evolved Packet System (EPS); Stage 3 (Release 12)", 3GPP TS 24,301 V12.0.0 (Mar. 2013), 345 pp.

3GPP, Technical Specification, "3rd Generation Partnership Project; Technical Specification Group Services and System Aspects; General Packet Radio Service (GPRS); Service description; Stage 2 (Release 12)", 3GPP TS 23.060 V12.0.0 (Mar. 2013), 338 pp.

* cited by examiner

| EXTERNAL IP ADDRESSES / PORTS | REPLACEMENT IP ADDRESSES AND PORTS |
|---|---|
| [...] | [...] |
| 164.125.1.178 / 467 | 10.1.1.17 / 467 |
| 148.37.98.118 / 14289 | 10.1.1.18 / 14289 |
| 221.187.1.159 / 23 | 10.1.1.19 / 23 |
| [...] | [...] |

FIG. 2

| IP ADDRESSES / PORTS | | REPLACEMENT IP ADDRESSES AND PORTS |
|---|---|---|
| [...] | ↕ | [...] |
| 164.125.1.178 / 467 | ↕ | 10.1.1.17 / 81 |
| 148.37.98.118 / 14289 | ↕ | 10.1.1.17 / 82 |
| 221.187.1.159 / 23 | ↕ | 10.1.1.17 / 83 |
| [...] | ↕ | [...] |

FIG. 3

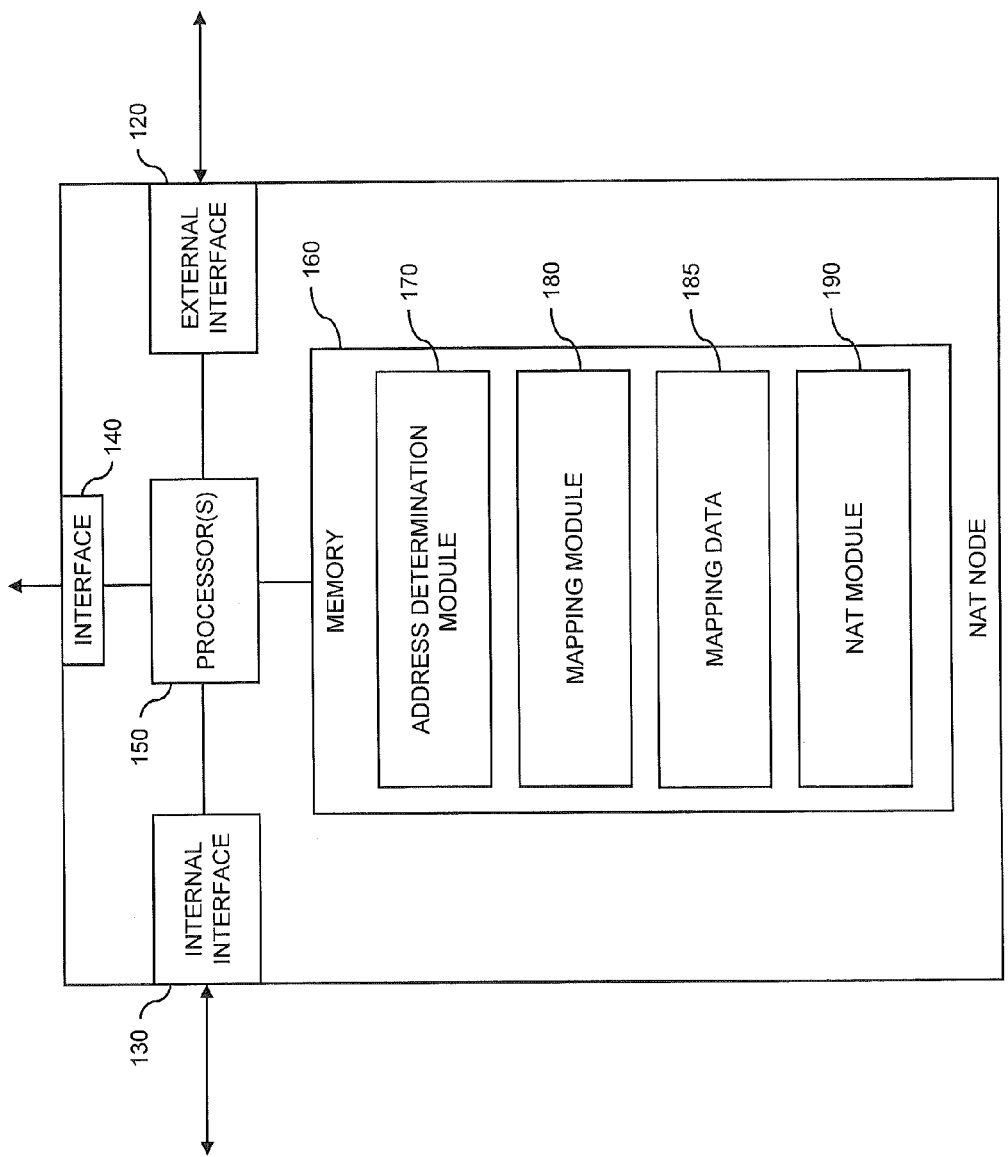

USER PLANE TRAFFIC HANDLING USING NETWORK ADDRESS TRANSLATION AND REQUEST REDIRECTION

CROSS-REFERENCE TO RELATED APPLICATION

The present application claims priority to European Patent Application No. 13162525.3, filed Apr. 5, 2013, the disclosure and content of which is hereby incorporated by reference as if set forth fully herein.

TECHNICAL FIELD

The present invention relates to methods for traffic classification using network address translation and to corresponding devices.

BACKGROUND

In communication networks, network traffic may be classified and the handling of the network traffic differentiated according to the traffic class. For example, a forwarding treatment of data packets, i.e., the way of forwarding a data packet on the way towards its destination, may be controlled to provide a certain Quality of Service (QoS) level which depends on the traffic class. In other examples, the handling of the network traffic may also be differentiated with respect to charging, i.e., one traffic class could be charged in a different manner than another. Typically, traffic classification rules are defined so as to implement the differentiation between different classes of network traffic.

For example, in mobile communication networks it is known to direct network traffic related to a specific service to a bearer offering a certain QoS level. In this respect, a bearer is considered to be an information transmission context or path of defined characteristics, e.g. capacity, delay and/or bit error rate. Typically, a number of bearers will be established between a gateway of a mobile communication network and a user equipment (UE), e.g., a mobile phone or other type of mobile terminal. A bearer may carry downlink (DL) data traffic in a direction from the network to the UE, and may carry data traffic in an uplink (UL) direction from the UE to the network. In the gateway and in the UE the data traffic, which includes a plurality of IP data packets (IP: "Internet Protocol", which may be the IP Version 4, also referred to as IPv4, or the IP Version 6, also referred to as IPv6) can be filtered, e.g., using IP 5-tuple packet filters, thereby directing the IP data packets to a desired bearer. According to the 3GPP (Third Generation Partnership Project) Technical Specifications (TSs) 23.060 V12.0.0 (2013-03) and 24.301 V12.0.0 (2013-03), a set of packet filters used to direct the data traffic to a certain bearer is also referred to as a Traffic Flow Template (TFT). In this context, a TFT can be considered as an example of a packet classification rule operating on the basis of one or more network addresses included in the data packets.

Differentiated handling of network traffic may also be useful in other types of communication network environment, e.g., using fixed access technology such as DSL (Digital Subscriber Line), fibre optical access, or coaxial cable access.

For simplifying traffic classification rules operating on the basis of one or more network addresses in a data packet, such as TFTs, it is known to perform network address translation (NAT) on data packets of the network traffic. For example, in WO 2012/052065 A1 a solution is described according to which the NAT may be used to adapt the network addresses of the data packets in such a way that data packets belonging to the same traffic class or to a similar traffic class carry network address identifiers from the same subnet. The traffic classification rule may then for example use wildcarding to detect the data packets, which allows for a simple structure of the traffic classification rule. The NAT may be used for simplifying the structure of traffic classification rules both for the DL direction from the network to the UE and for the UL direction from the UE to the network. In WO 2012/052065 A1 also scenarios are addressed which may occur when using certain protocols requiring a connection handshake at the beginning of a session, such as for example defined in RFC 793 for the Transmission Control Protocol (TCP). The TCP connection handshake involves that a node initiating a TCP session with another node sends a connection setup request in the form of a data packet including a synchronization (SYN) flag to the other node, and that the other node responds with a setup accept message in the form of a data packet including a synchronization acknowledgement (SYN-ACK) flag.

When using the NAT to assist in the traffic classification, changes in the network address of a node should be avoided while the node is engaged in a TCP session. In particular, if the node initially sends the SYN packet to a given IP address and port and receives the SYN-ACK packet from this IP address and port, the TCP implementation at the node will typically also assume that the subsequent data packets of this session should be communicated with this IP address and port. If the NAT changes the IP address and/or port during the ongoing TCP session, this most likely results in failure of further communication in this TCP session. Accordingly, WO 2012/052065 A1 provides a solution in which already the first data packet of a session initiated by the UE, i.e., the first UL data packet transmitted from the UE to a server, is sent with a certain replacement network address matching a traffic classification rule. The NAT translates this replacement network address into an external network address which is suitable for routing the data packet to the server. For providing the replacement network address to the UE, Domain Name System (DNS) messages transmitted to or from the UE when preparing the session are inspected and modified. In particular, a traffic adaptation device may inspect a DNS query sent by the UE to obtain the network address of the server and detect that the traffic with this server should be classified in a certain way. Subsequently, the traffic adaptation device may intercept a response to this DNS query and modify the response by inserting the replacement network address in place of the network address of the server. The UE then uses the replacement network address to indicate the destination of the first UL data packet to the server.

However, the above solution of WO 2012/052065 A1 may require significant resources for inspecting and processing the data traffic of the UE.

Accordingly, there is a need for alternative techniques which may be used for efficiently providing a UE with a replacement network address to be used for NAT assisted traffic classification.

SUMMARY

According to an embodiment of the invention, a method of handling user plane traffic in a communication network is provided. According to the method, a node of the communication network determines a mapping between a network address of a server and a replacement network address matching a packet classification rule implemented in the communication network. To provide a UE with the replacement network address, a further node of the communication network is configured to perform redirection of a query from the UE. The node further receives a UL data packet of the user plane data traffic. A source address identifier of the UL data packet corresponds to a network address of the UE, and a destination address identifier in the UL data packet corresponds to the replacement network address. According to the mapping, the node performs NAT of the received UL data packet. This is accomplished at least by modifying the destination address identifier in the UL data packet to correspond to the network address of the server. The node then sends the modified UL data packet toward the server.

According to a further embodiment of the invention, a node for handling user plane traffic in a communication network is provided. The node comprises at least one processor, a first interface for coupling to a user equipment, and a second interface for coupling to a server. The at least one processor is configured to determine a mapping between a network address of a server and a replacement network address matching a packet classification rule implemented in the communication network. To provide a UE with the replacement network address, a further node of the communication network is configured to perform redirection of a query from the UE. The at least one processor is further configured to receive, via the first interface, an UL data packet of the user plane data traffic. A source address identifier in the UL data packet corresponds to a network address of the UE, and a destination address identifier in the UL data packet corresponds to the replacement network address. The at least one processor is further configured to perform, according to the mapping, NAT of the received UL data packet by modifying the destination address identifier of the UL data packet to correspond to the network address of the server. The at least one processor is further configured to send the modified UL data packet via the second interface toward the server.

According to a further embodiment of the invention, a system for handling user plane traffic in a communication network is provided. The system comprises a node and a further node. The node is configured to determine a mapping between a network address of a server and a replacement network address matching a packet classification rule implemented in the communication network. Further, the node is configured to receive an UL data packet of the user plane data traffic. A source address identifier in the UL data packet corresponds to a network address of the UE. A destination address identifier in the UL data packet corresponds to the replacement network address. Further, the node is configured to perform, according to the mapping, NAT of the received UL data packet by modifying the destination address identifier in the UL data packet to correspond to the network address of the server. Further, the node is configured to send the modified UL data packet toward the server. To provide the UE with the replacement network address, the further node is configured to perform redirection of a query from the UE.

According to a further embodiment of the invention, a computer program product is provided. The computer program product comprises program code to be executed by at least one processor of a node for handling user plane traffic in a communication network. By execution of the program code, the node is configured to determine a mapping between a network address of a server and a replacement network address matching a packet classification rule implemented in the communication network. Further, the node is configured to receive an UL data packet of the user plane data traffic. A source address identifier in the UL data packet corresponds to a network address of the UE. A destination address identifier in the UL data packet corresponds to the replacement network address. Further, the node is configured to perform, according to the mapping, NAT of the received UL data packet by modifying the destination address identifier in the UL data packet to correspond to the network address of the server. Further, the node is configured to send the modified UL data packet toward the server. To provide the UE with the replacement network address, a further node is configured to perform redirection of a query from the UE.

BRIEF DESCRIPTION OF THE DRAWINGS

FIG. 2 schematically illustrates an example of a table for mapping network addresses to replacement network addresses.

FIG. 3 schematically illustrates a further example of a table for mapping network addresses to replacement network addresses.

FIG. 13 schematically illustrates a node according to an embodiment of the invention.

DETAILED DESCRIPTION OF EMBODIMENTS

Figure 1:
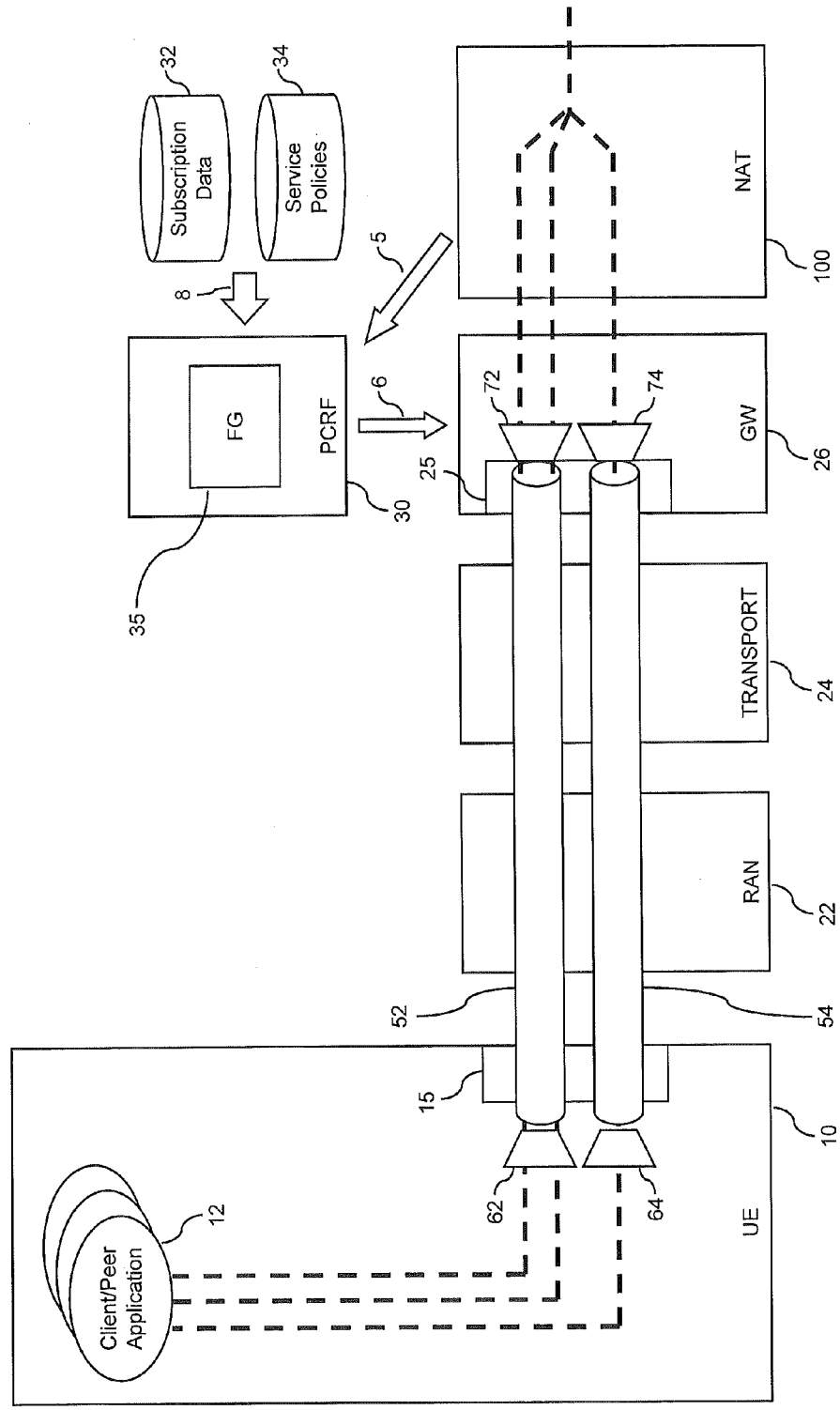
FIG. 1 schematically illustrates a mobile communication network in which concepts according to embodiments of the invention may be implemented.

In the following, concepts according to various embodiments of the invention will be explained in more detail by referring to exemplary embodiments and to the accompanying drawings. The illustrated concepts relate to NAT assisted traffic classification. As illustrated in FIG. 1, the concepts are applied in a 3GPP mobile communication network. However, it is to be understood that the illustrated concepts may be applied in other types of communication network as well, e.g. using fixed access technology such as DSL, fiber optical access, or coaxial cable access.

FIG. 1 schematically illustrates a communication network environment in which concepts according to embodiments of the invention the invention can be applied.

The communication network environment includes a UE 10, which may also be referred to as a terminal, and a number of network components 22, 24, 26, 30. Among these network components there is a Radio Access Network (RAN) 22. The RAN 22 is based on a certain type or certain types of radio access technology, e.g., GSM (Global System for Mobile Communications), EDGE (Enhanced Data Rate for GSM Evolution), UMTS (Universal Mobile Telecommunications System) or LTE (Long Term Evolution). Although the RAN 22 is illustrated as a single node, it is to be understood that the RAN 22 may actually be formed of a number of components, which are not further explained herein. The RAN 22 is coupled to a transport node 24, which in turn is coupled to a gateway (GW) 26. Here, it is to be understood that alternatively more than one transport node 24 may be coupled between the RAN 22 and the gateway 26 or that the RAN 22 may be directly coupled to the gateway 26. Depending on the utilized radio access technology, the gateway 26 may for example be a Gateway GPRS Support Node (GGSN) or a Packet Data Network Gateway (PDN GW).

In addition, the mobile communication network includes a policy controller 30, which is implemented as a Policy and Charging Rules Function (PCRF). The gateway 26 and the policy controller 30 are typically regarded as components of a core network. The policy controller 30 communicates with the gateway 26 via a signaling path 6, which may be implemented using the Gx interface as specified by 3GPP. The policy controller 30 may be further coupled to a subscription database 32 and to a service policy database 34 via a signaling path 8, e.g., implemented using a Sp interface as specified by 3GPP. The policy controller 30 may thus receive policy data relating to a specific user and/or relating to a specific service available in the mobile communication network, e.g., mobile TV. The policy controller 30 may further communicate with other network functions using a control signaling path 5, which may be implemented using the Rx interface as specified by 3GPP.

Among other functions, the policy controller 30 may comprise a filter generator 35. The filter generator 35 is adapted to specify packet filters to be used in the UE 10 and the gateway 26, which may be accomplished on the basis of subscription data from the subscription database 32, service policies from the service policy database 34, and control data received via the signaling path 5. The packet filters are an example of packet classification rules, which in the illustrated example are used to provide different QoS service levels depending on the traffic class. In other examples, packet filters or other packet classification rules could be used to differentiate between different ways of charging, to selectively block certain traffic classes, which may also be referred to as gating, or to selectively redirect certain traffic classes.

As further illustrated, data traffic between the network and the user equipment 10 is carried by a number of bearers 52, 54. The data traffic typically pertains to one or more client/peer applications 12 running on the UE 10. The bearers 52, 54 are established between the UE 10 and the gateway 26. The bearers 52, 54 carry data traffic in both the DL and the UL direction, i.e. may also be regarded as being formed of a DL bearer and a UL bearer. For supporting bidirectional communication on the bearers 52, 54, the UE 10 is provided with a corresponding interface 15 which allows for receiving incoming data packets from the bearers 52, 54 and sending outgoing data packets on the bearers 52, 54. Similarly, the gateway 26 is provided is provided with a corresponding interface 25 which allows for receiving incoming data packets from the bearers 52, 54 and sending outgoing data packets on the bearers 52, 54. The bearers 52, 54 may include a default bearer 52 generally established for offering packet-based services to the user equipment 10 and one or more dedicated bearer 54 which may have different QoS level, e.g., a higher or lower QoS level, than the default bearer. The default bearer 52 is typically established when the UE 10 attaches to the gateway 26. The dedicated bearer is typically established on demand, e.g., when data packets requiring a certain QoS level need to transmitted. However, in some embodiments dedicated bearers may also established in advance, e.g., when the UE 10 attaches to the gateway 26. Each bearer 52, 54 may be associated with a corresponding QoS profile. The QoS profile may be defined through parameters such as a QoS Class Identifier (QCI), an Allocation/Retention Priority (ARP), a Traffic Handling Priority (THP), a Maximum Bit Rate (MBR), an Aggregate Maximum Bit Rate (AMBR), and/or a Guaranteed Bit Rate (GBR). Accordingly, a certain QoS level may be provided for communicating data packets between the UE 10 and the gateway 26 by assigning the data packets to a corresponding one of the bearers 52, 54.

In the UE 10, the data packets may be routed to a desired bearer 52, 54 using correspondingly configured packet classification rules in the form of UL packet filters 62, 64. In the gateway 26, the data packets may be routed to the desired bearer 52, 54 using correspondingly configured packet classification rules in the form of DL packet filters 72, 74. In accordance with the illustrated 3GPP scenario, a set of filters 62, 64, 72, 74 which operates to direct the data packets to a corresponding bearer may also be referred to as a TFT. Parameters of the QoS profile may be signaled from the policy controller 30 to the gateway 26 using the signaling path 6. Similarly, the DL packet filters 72, 74 to be used in the gateway 26 may be signaled from the policy controller 30 to the gateway 26 via the signaling path 6. As regards the UL packet filters 62, 64 used in the UE 10, these may be signaled from the policy controller 30 via the gateway 26.

The packet filters 62, 64, 72, 74 are generally configured to operate on the basis of network addresses, which are included in a respective protocol header of the data packets. For example when using TCP for implementing transport of data by the data packets, the protocol header will include IP addresses defining a source network address and a destination network address of the data packet, which can be used separately or in combination as a basis for matching a filter pattern defined in the packet filter 62, 64, 72, 74. Moreover, the above examples of a protocol header will also define a source port number and a destination port number, which can be used separately or in combination as a basis for matching a filter pattern defined in the packet filter 62, 64, 72, 74. In some embodiments, the packet filters 62, 64, 72, 74 may operate on the basis of a pattern for matching an IP 5 tuple (source IP address, destination IP address, source port number, destination port number, protocol ID of the protocol above IP) of the data packets. Further, the packet filters may operate on a filter pattern in which an IP address is be combined with a prefix mask, and/or port numbers are be specified as port ranges. The filter pattern can also be extended by the Type of Service (TOS) (IPv4)/Traffic class (IPv6) and Mask. The filter pattern can also consist of the destination IP address, protocol ID of the protocol above IP, the Type of Service (TOS) (IP Version 4)/Traffic class (IP Version 6) and Mask and the IPSec Security Parameter Index (SPI). The filter pattern can also consist of the destination IP address, the Type of Service (TOS) (IPv4)/Traffic class (IPv6) and Mask and the Flow Label (IPv6). In some embodiments, a value left unspecified in the filter pattern packet filter 62, 64, 72, 74 may match any value of the corresponding information in the data packet, i.e., wildcards may be defined.

In typical network traffic, the information in the protocol headers of data packets, in particular with respect the source and destination addresses, may vary considerably due to the fact that the data packets may be communicated with any host, and the network address used by this host may be any network address from the available public address space. Irrespective of significant differences in the information of the protocol headers, data packets may still belong to the same traffic class, e.g., a traffic class for which in the example of FIG. 1 the data packets should be directed to the same bearer 52, 54.

In order to reduce complexity of the packet filters 62, 64, 72, 74, concepts according to embodiments of the invention as explained in the following are based on NAT assisted classification of the data traffic. In particular, a NAT node 100 may be used to translate the network addresses in the TCP/IP header of the data packets in such a way that simplified packet filters 62, 64, 72, 74 may be used to perform traffic classification and direct the data traffic to the desired bearers 52, 54. For example, the UE 10 may send a UL data packet, which is intended to be received by a certain server or IP peer, with a destination address identifier corresponding to a replacement network address mapped to the network address of the server. The replacement network matches for example the UL packet filter 64, thereby directing the UL data packet to the bearer 54. The NAT node 100 translates the replacement network address into the network address of the server, i.e., modifies the destination address identifier to correspond to the network address of the server. A source address identifier of the UL data packet as transmitted by the UE 10 will correspond to the network address of the UE 10. The NAT node 100 may also operate to translate the network address of the UE 10 into a further replacement network address which is mapped to the network address of the UE 10, i.e., modify the source address identifier of the UL data packet to correspond to the further replacement network address. When responding to the UL data packet, the server will send a DL data packet with a destination address identifier corresponding to the further replacement network address and a source address identifier corresponding to the network address of the server. The destination address identifier causes the DL data packet to be routed to the NAT node 100. The NAT node 100 may then translate the further replacement network address into the mapped network address of the UE 10, i.e., modify the destination address identifier of the DL data packet to correspond to the network address of the UE 10.

Further, the NAT node 100 may translate the network address of the server into the mapped replacement network address. The replacement address also matches the DL packet filter 74, thereby directing the DL data packet to the bearer 54. As can be seen, the replacement network address may be used by the packet filters 64, 74 to direct the UL data packet and the DL data packet to the bearer 54. By suitable selection of the replacement network address, the structure of the packet filters 64, 74 can be kept simple. For example, if a certain traffic class is intended to be directed to the bearer 54, the replacement network address may be selected from a certain subnet, and replacement addresses for other servers associated with this traffic class could be selected from the same subnet. Accordingly, the packet filters may 64, 74 may for example use wildcards to identify data packets related to this traffic class. Accordingly, the NAT node 100 may bring the data traffic into a form which facilitates the differentiated handling. The further replacement network address may in turn be used for attracting the data traffic to which the NAT assisted traffic classification is applied to the NAT node 100. Other data traffic, e.g., from other servers for which the NAT assisted traffic classification is not applied, may use other routes, i.e., does not need to be processed by the NAT node 100. This enables an efficient implementation of the NAT node 100.

Accordingly, in implementations as explained in the following the NAT node 100 may perform NAT on received UL data packets by translating the destination address identifier from a replacement network address into an external network address to which the replacement network address is mapped, and optionally also by translating the source address identifier from the network address of the UE 10 into a further replacement network address mapped thereto. Similarly, the NAT node 100 may perform NAT on received DL data packets by translating the source address identifier from the external network address into the replacement network address mapped thereto, and optionally also by translating the destination address identifier from the further replacement network address into the network address of the UE 10. In this way, the replacement network address may be efficiently used for performing traffic classification.

By using the replacement network address as the basis for traffic classification, differentiated handling of one or more traffic classes can be facilitated in a significant manner. In one scenario, already the use of the replacement network address could indicate that the data packet belongs to a certain traffic class. For example, the replacement network address could be used only in data packets which belong to a certain traffic class, e.g., "premium" or "trash". The packet filters could then operate to simply identify those data packets carrying the replacement network address in the destination address identifier (for UL data packets) or in the source address identifier (for DL data packets) and direct the identified data packets to the desired bearer. For example, if the replacement network address is selected from a specific address range, e.g., from a subnet or from a range of neighboring addresses, distinguishing between replacement network addresses and external network addresses can be implemented in a very efficient manner using wildcards or ranges in the filter pattern for matching the network addresses. In a further scenario, the selection of different replacement network addresses from a different address ranges, e.g., different subnets or non-overlapping ranges of neighboring addresses, could be used to differentiate between multiple different traffic classes. For example, different traffic classes could be assigned to corresponding subnets. In this way, distinguishing between different replacement network address ranges assigned to different traffic classes can be implemented in a very efficient manner using wildcards in the filter pattern for matching the network addresses. In some embodiments, when assuming a given assignment of one or more traffic classes to corresponding replacement address ranges, the packet filters could even be preconfigured in the UE 10 or in the gateway 26, thereby avoiding the need for dynamic generation or signaling of the packet filters.

In some embodiments the external network address and the network address of the UE 10 may be public network addresses, e.g., public IP version 4 (IPv4) addresses or public IP version 6 (Ipv6) addresses. The replacement network address and/or the further replacement network address may in turn be private network addresses, e.g., as defined in RFC 1918, RFC 4193, or RFC 5735. However, the replacement network address and/or the further replacement network address could also be public network addresses, e.g., public IPv4 or IPv6 addresses.

In the illustrated implementations, the NAT is based on a mapping of external addresses to corresponding replacement network addresses. The mapping between external network addresses and replacement network addresses may be dynamically generated, e.g., in response to detecting that data traffic of a certain server belongs to a certain traffic class. In some embodiments, the mapping may also be preconfigured, e.g., by a network operator.

FIG. 2 schematically illustrates an exemplary replacement table used for defining a mapping between external network addresses and replacement network addresses. As illustrated, both the external network addresses and the replacement network addresses include network addresses from the IPv4 address space an further include port numbers. The external network addresses are public addresses, whereas the replacement network addresses are from a private subnet of the total address space. A one-to-one mapping is defined between the external network addresses and the replacement network addresses. Accordingly, the network address translation on incoming data packets will always replace an external source address with the corresponding replacement network address, and the network address translation on the outgoing data packets can retranslate this replacement network address to the original external network address, thereby providing compatibility to protocols using bidirectional exchange of data packets, e.g., when sending acknowledgement data packets in response to successfully receiving a data packet such as in TCP. In the example of FIG. 2, the port numbers of the external network addresses are mapped to the same port numbers of the replacement network addresses. When assuming that all traffic with respect to the external network addresses illustrated in the replacement table of FIG. 2 belongs to the same traffic class, it can be seen that differentiated handling on the basis of the replacement network addresses can be implemented in a very efficient manner by defining a packet classification rule which identifies data packets on the basis of the IP address range as used for the illustrated replacement network addresses, e.g., the IP address range from "10.1.1.17" to "10.1.1.20". The latter range may be efficiently expressed by a prefix bitmask. Also, a packet classification rule could be defined which operates on the basis of a wildcard, e.g., identifies data packets in which the replacement network address matches the pattern "10.1.1.X", where X is a wildcard placeholder matching any possible value in the replacement network addresses of the data packets. Also such wildcards may be efficiently expressed using a bit mask. In the illustrated example, a bit mask of "10.1.1.0/24" or "10.1.1.0/255.255.255.0" could be used.

FIG. 3 schematically illustrates a further exemplary replacement table used for defining a mapping between external network addresses and replacement network addresses. Again, both the external network addresses and the replacement network addresses include network addresses from the IPv4 address space an further include port numbers. The external network addresses are public addresses, whereas the replacement network addresses are from a private subnet of the total address space. A one-to-one mapping is defined between the external network addresses and the replacement network addresses. Accordingly, the network address translation on incoming data packets will always replace an external source address with the corresponding replacement network address, and the network address translation on the outgoing data packets can retranslate this replacement network address to the original external network address. In the example of FIG. 3, different external network addresses are mapped to the same IP address of the replacement network addresses, but to different port numbers. In this way, the IP address space which is available for the replacement network addresses can be used in a very efficient manner. When assuming that all traffic with respect to the external network addresses illustrated in the replacement table of FIG. 3 belongs to the same traffic class, it can be seen that differentiated handling on the basis of the replacement network addresses can be implemented in a very efficient manner by defining a packet classification rule which identifies data packets on the basis of the single IP address as used for the illustrated replacement network addresses, i.e., the IP address "10.1.1.17", but disregards the port numbers of the replacement network addresses.

For the further replacement network address, similar mapping tables may be used.

In the following, concepts will be explained in more detail which allow for efficiently defining the mapping between an external network address and the replacement network address and for enabling the UE 10 to use the correct replacement network address already in the destination address identifier of the first UL data packet of a session sent to a peer, e.g., in a TCP SYN packet. In this way compatibility with the TCP connection handshake procedure or similar handshake procedures may be provided. As further explained in the following, this may be accomplished by redirection of a query from the UE 10, e.g., redirection of DNS query or redirection of a Hypertext Transfer Protocol (HTTP) request. In the following, the peer will also be referred to as a server. However, the term "server" is not intended to imply any hardware limitations, but rather refers to the functionality of establishing a packet-data session with the UE 10 as a client. For example, the server could also be implemented in another UE.

More specifically, in some implementations a DNS node may be configured with information to resolve a DNS query, issued by the UE 10 to obtain the network address of the server, with a replacement network address to be used for the data traffic with this server. According to one option, the mapping between the network address and the replacement network address could be determined at the NAT node 100, and according to the mapping the NAT node 100 could configure an entry in the DNS node to resolve the DNS query with the replacement network address, thereby configuring a DNS redirection. According to a further option, the DNS redirection could be otherwise configured in the DNS node, e.g., by an operator, and the NAT node 100 could determine the mapping by sending DNS queries to obtain both the network address of the server and the replacement address.

In further implementations, a HTTP redirection may be used to provide the UE 10 with the replacement network address. In this case, the UE 10 may initially send a HTTP request to the network address of the server. However, using the HTTP redirection the UE 10 is then informed that the requested object has moved to another network location which is associated with the replacement network address. This has the effect that the UE 10 establishes a new session by resending the HTTP request to the replacement network address.

Figure 4:
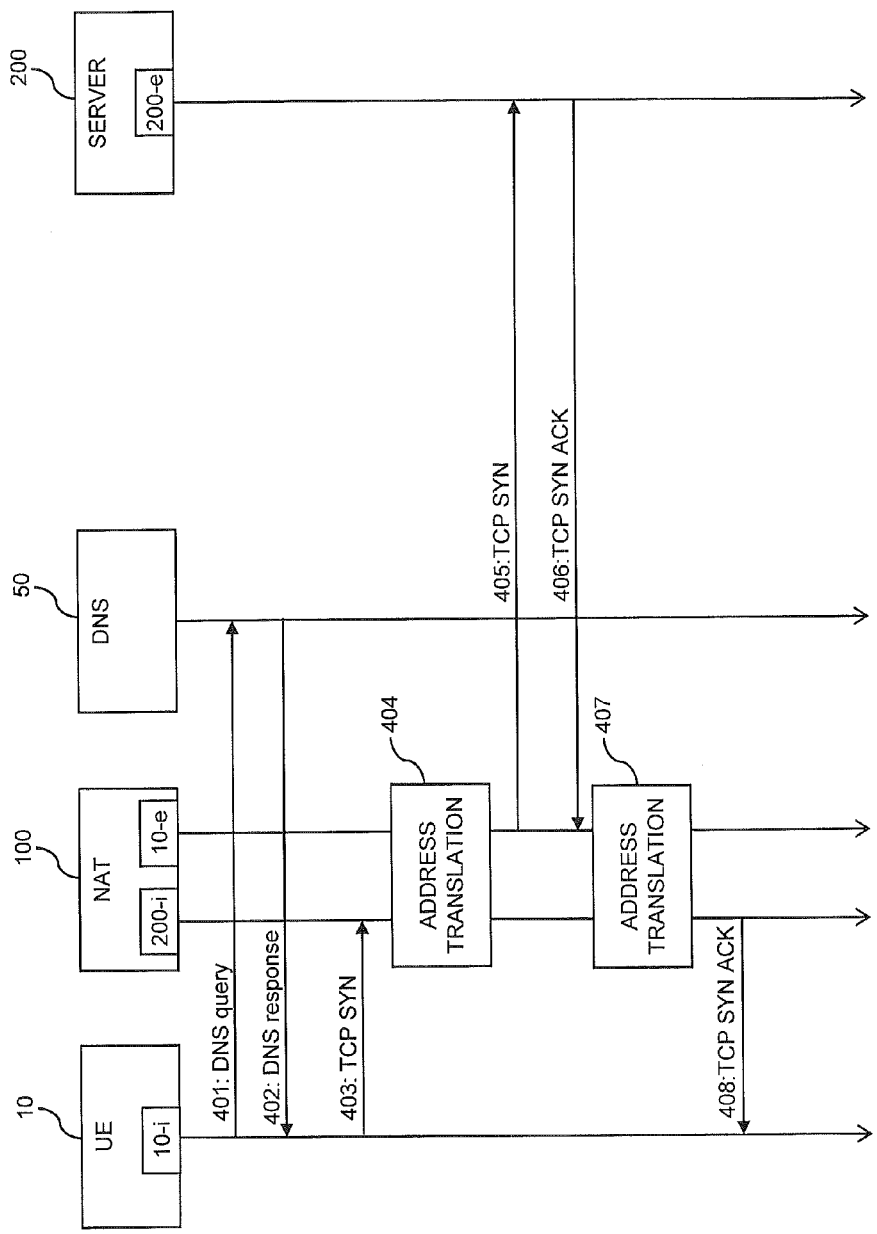
FIG. 4 illustrates an exemplary traffic classification process according to an embodiment of the invention.

FIG. 4 shows a signaling diagram for illustrating an exemplary NAT assisted traffic classification process which is based on a DNS redirection. The process involves the UE 10, the NAT node 100, a DNS node 50, and a server 200. The DNS node 50 may for example be a local DNS node hosted by the operator of the mobile communication network. The server 200 may for example provide store content which may be requested by users, e.g., media files, software, or the like.

As illustrated, a network address 10-*i* is assigned to the UE 10. The network address 10-*i* may be used for routing data packets to the UE 10. The network address 10-*i* of the UE 10 may be an IPv4 address or an IPv6 address. In the following, it is assumed that the network address 10-*i* of the UE 10 is a public network address. However, in some implementations, the network address 10-*i* could also be a private network address. In such implementations, an additional NAT instance could be used to translate the private address 10-*i* into a public address, e.g., between the NAT node 100 and the server 200. Further, a network address 200-*e* is assigned to the server 200. The network address 200-*e* may be used for routing data packets to the server 200. The network address 200-*e* of the server 200 may be an IPv4 address or an IPv6 address. Also the network address 200-*e* is assumed to be a public network address.

In accordance with the concepts as outlined above, a replacement network address 200-*i* is mapped to the network address 200-*e* of the server 200. The replacement network address 200-*i* is assigned to an internal interface of the NAT node 100, i.e., data packets having a destination address identifier corresponding to the replacement network address 200-*i* will be routed to the internal interface of the NAT node 100. The replacement network address 200-*i* may be an IPv4 address or an IPv6 address. The replacement network address 200-*i* may be a private network address. In the latter case it may be suitable for routing data packets in only in a private network section extending from the internal interface of the NAT node 100. As further illustrated, a further replacement network address 10-*e* may be mapped to the network address 10-*i* of the UE 10. The further replacement network address 10-*e* is assigned to an external interface of the NAT node 100, i.e., data packets having a destination address identifier corresponding to the further replacement network address 10-*e* will be routed to the external interface of the NAT node 100. The further replacement network address 10-*e* may be an IPv4 address or an IPv6 address. Also the further replacement network address 10-*e* is assumed to be a public network address. The mapping of the replacement network address 200-*i* to the network address 200-*e* of the server 200 and the mapping of the further replacement network address 10-*e* to the network address of the UE 10 are configured in the NAT node 100, e.g., in the form of a replacement table as illustrated in FIG. 2 or 3. In some implementations, the network address 10-*i* of the UE 10 could also be used on the external side of the NAT node 100 to identify the UE 10, i.e., the network address 10-*i* of the UE 10 and the further replacement network address 10-*e* could be the same. In the latter case, the network address 10-*i*/10-*e* would not be assigned to the external interface of the NAT node 100, but the external interface of the NAT node 100 would correspond to one hop in a routing path between the network address 200-*e* and the network address 10-*i*/10-*e* assigned to the UE 10.

In the process of FIG. 4, the UE 10 may prepare a session with the server 200 by first issuing a DNS query 401 to obtain the network address 200-*e* of the server 200. The DNS query typically may for example indicate a hostname, which is used by the DNS node 50 to resolve the DNS query 401.

The DNS node 50 is configured with a DNS redirection. That is to say, the DNS node 50 is configured to resolve the DNS query 401 with the replacement network address 200-*i*, and not with the network address 200-*e*. As further explained below, this configuration may be controlled dynamically by the NAT node 100, or may be controlled in some other way, e.g., be statically set by the operator.

Having resolved the DNS query 401, the DNS node 50 sends a DNS response 402 to the UE 10. The DNS response 402 indicates the replacement network address 200-*i* to the UE 10. Accordingly, the UE 10 will use the replacement network address 200-*i* in the destination address identifier of future UL data packets sent to the server 200.

In particular, when establishing a TCP session with the server 200, the UE 10 sends a TCP SYN packet 403 to the replacement network address 200-*i*. Accordingly, the TCP SYN packet 403 carries a destination address identifier corresponding to the replacement network address 200-*i* and a source address identifier corresponding to the network address 10-*i* of the UE 10.

The TCP SYN packet 403 is received at the internal interface of the NAT node 100. At step 404, the NAT node 100 performs NAT of the TCP SYN packet 403 in accordance with the mapping configured in the NAT node 100. This is accomplished by modifying the destination address identifier to correspond to the mapped network address 200-*e* of the server 200 and by modifying the source address identifier to correspond to the further replacement network address 10-*e* which is mapped to the network address of the UE 10. The translated TCP SYN packet 405 is then sent from the external interface of the NAT node 100.

As further illustrated, the server 200 receives the translated TCP SYN packet 405 and responds with a TCP SYN-ACK packet 406. In accordance with the usual TCP connection handshake procedure, the TCP SYN-ACK packet 406 carries a destination address identifier corresponding to the further replacement network address 10-*e* and a source address identifier corresponding to the network address 200-*e* of the server 200.

The TCP SYN-ACK packet 406 is received at the external interface of the NAT node 100. At step 407, the NAT node 100 performs NAT of the TCP SYN-ACK packet 406 in accordance with the mapping configured in the NAT node 100. This is accomplished by modifying the destination address identifier to correspond to the network address 10-*i* of the UE 10 and by modifying the source address identifier to correspond to the replacement network address 200-*i*. The translated TCP SYN-ACK packet 408 is then sent from the internal interface of the NAT node 100.

When the UE 10 receives the translated TCP SYN-ACK packet 408, the TCP connection handshake procedure is completed, and the UE 10 may continue with sending UL data packets to the server 200 and receiving DL data packets in response thereto, using the same destination address identifiers and source address identifiers as in the TCP SYN packet 403 and the translated TCP SYN-ACK packet 408. That is to say, further UL packets between UE 10 and server 200 are treated by the NAT node 100 in a similar way as TCP SYN packet 403, and further DL data packets between server 200 and UE 10 are treated in a similar way as TCP SYN-ACK packet 406. Accordingly, the replacement network address 200-*i* in these UL and DL data packets as transmitted between the UE 10 and the NAT node 100 may be efficiently used for traffic classification with one or more traffic classification rules matching the replacement network address 200-*i*, e.g., for directing the data packets to a certain bearer by using packet filters as explained in connection with FIG. 1.

Figure 5:
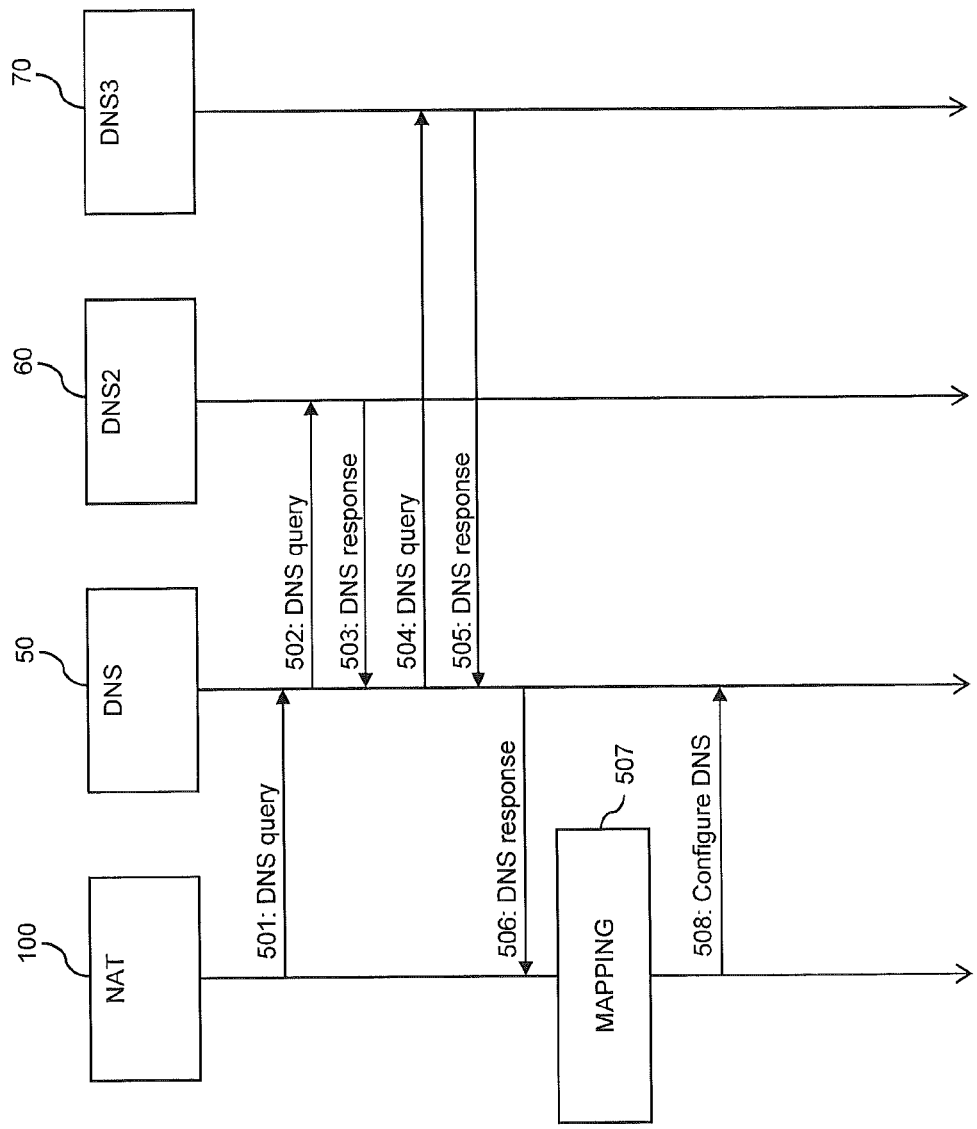
FIG. 5 illustrates exemplary processes according to an embodiment of the invention, which may be used in connection with the process of FIG. 4 for determining a mapping between a network address of a server and a replacement network address.

FIG. 5 shows a signaling diagram for illustrating exemplary processes for configuring the address mapping and DNS redirection to be applied in a NAT assisted traffic classification process as for example explained in connection with FIG. 4. The processes of FIG. 5 involve the NAT node 100, the DNS node 50, and further DNS nodes 60, 70. The further DNS node 60 is assumed to be a root DNS node, and the further DNS node 70 is assumed to be a DNS node which is authoritative for the domain of the server 200.

In the processes of FIG. 5, the NAT node 100 issues a DNS query 501 to obtain the network address 200-*e* of the server 200. For example, the hostname of the server 200 may be configured in the NAT node 100 as a hostname associated with a certain traffic class, and the NAT node 100 may repeatedly issue DNS queries with this hostname, e.g., according to a periodic schedule. In this way, the NAT node 100 may obtain up-to date information on the network address **200-*e* currently assigned to the server 200**.

As illustrated, the DNS query 501 may be received by the DNS node 50, which then attempts to resolve the DNS query 501 by looking up entries for the hostname indicated in the DNS query 501. In the processes of FIG. 5, it is assumed that the DNS query 501 cannot be directly resolved by the DNS node 50, e.g., because an entry for the hostname indicated in the DNS query 501 does not exist yet.

Accordingly, the DNS node 50 proceeds by issuing a further DNS query 502 with the hostname to the further DNS node 60. The further DNS node 60, which is a root DNS node, resolves the DNS query 502 with a network address of the further DNS node 70, which is authoritative for the domain of the server 200. The further DNS node 60 sends DNS response 503 to the DNS node 50. DNS response 503 indicates the network address of the further DNS node 70 to the DNS node 50.

The DNS node 50 may then issue a still further DNS query 504 to the further DNS node 70. The DNS node 70, which is authoritative for the domain of the server 200, resolves the DNS query 504 with the network address **200-*e* of the server 200. The further DNS node 70 sends DNS response 505 to the DNS node 50. DNS response 505 indicates the network address 200-*e* of the server 200 to the DNS node 50**.

Having received DNS response 505, the DNS node 50 may cache a DNS entry which associates the hostname of the server 200 to the network address **200-*e* of the server 200. Further, the DNS node 50 sends DNS response 506 to the NAT node 100. DNS response 506 indicates the network address 200-*e* of the server 200 to the NAT node 100**.

The NAT node 100 may then suitably select the replacement network address **200-*i*, e.g., from a certain subrange or subnet, and map the replacement network address 200-*i* to the network address 200-*e* of the server 200, as indicated by step 507. This may for example involve creating an entry in a replacement table as illustrated in FIG. 2 or 3**.

Further, the NAT node 100 sends configuration message 508 to the DNS node 50, to configure the DNS node 50 with a DNS redirection to the replacement network address **200-*i*. Upon receiving the configuration message 508, the DNS node 50 configures a DNS entry in accordance with the redirection. This DNS entry associates the hostname of the server 200 with the replacement network address 200-*i* of the server 200. This may be accomplished in a UE-specific way. That is to say, configuration of the DNS redirection causes the DNS node 50 to resolve future DNS queries from the UE 10 for the hostname of server 200, e.g., the DNS query 401 of FIG. 4, with the replacement network address 200-*i* while other DNS queries with the hostname of the server 200 may be resolved with the network address 200-*e* of the server 200**.

The UE-specific configuration of the DNS redirection may for example be implemented by configuring the DNS node 50 to resolve the DNS queries for the hostname of the server 200 depending on a source address identifier in the DNS query. In this way, a DNS query which has a source address identifier corresponding to the network address of the UE 10 or being from the same address subrange as the network of the address of the UE 10 may be resolved in a different manner than other DNS queries. Further, the UE-specific configuration of the DNS redirection could be implemented by providing the DNS node with multiple network addresses and configuring the UE 10 to use a specific one of these network addresses for issuing DNS queries. The DNS node 50 may then resolve the DNS queries for the hostname of the server 200 depending on the network address on which the DNS query was received. The UE-specific configuration of the DNS redirection may also pertain to a group of UEs including the UE 10, e.g., a group of UEs for which a similar traffic handling policy is defined.

Figure 6:
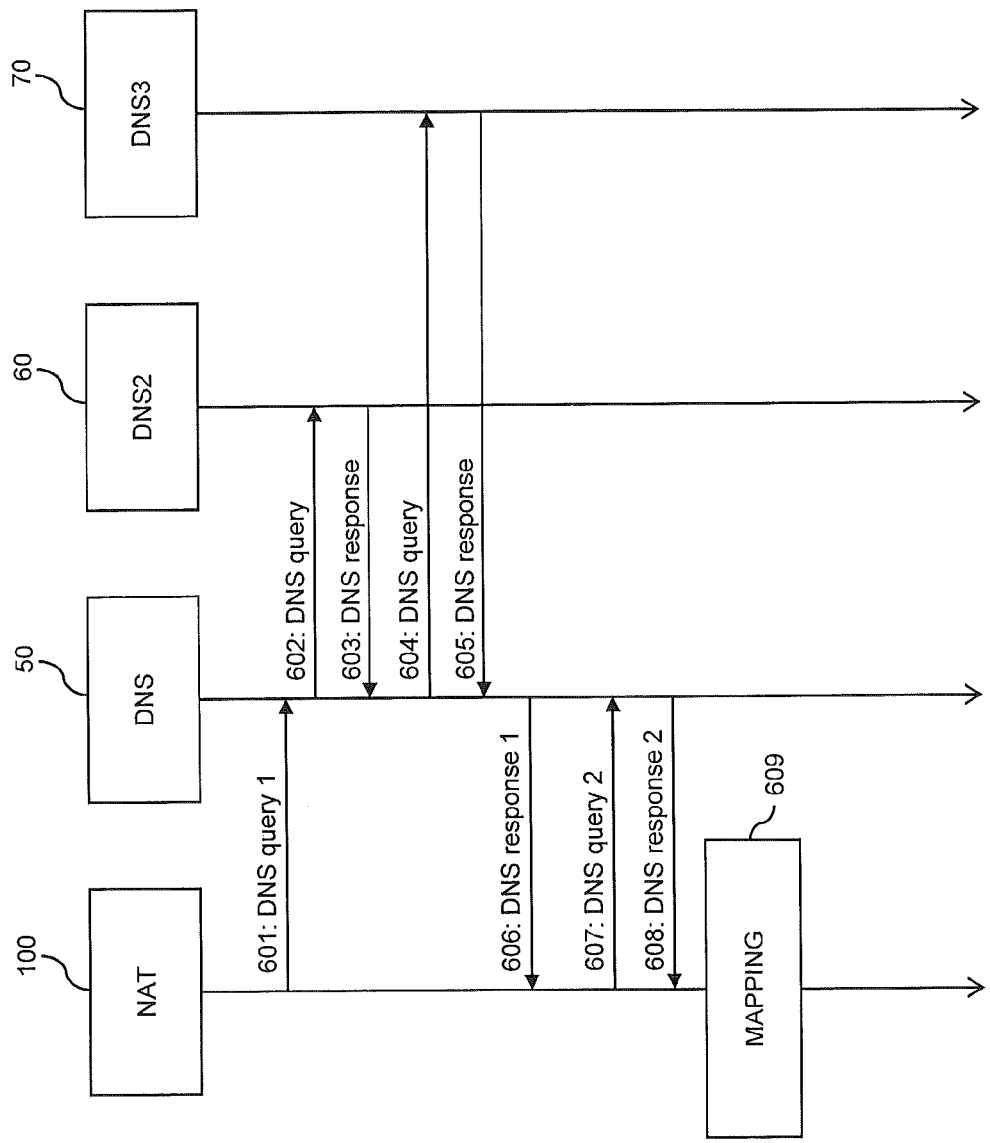
FIG. 6 illustrates further exemplary processes according to an embodiment of the invention, which may be used in connection with the process of FIG. 4 for determining a mapping between a network address of a server and a replacement network address.

FIG. 6 shows a signaling diagram for illustrating further exemplary processes for configuring the address mapping and DNS redirection to be applied in a NAT assisted traffic classification process as for example explained in connection with FIG. 4. The processes of FIG. 6 involve the NAT node 100, the DNS node 50, and further DNS nodes 60, 70. The further DNS node 60 is assumed to be a root DNS node, and the further DNS node 70 is assumed to be a DNS node which is authoritative for the domain of the server 200. Further, the DNS node 50 is assumed to be already configured with a UE-specific DNS redirection for the hostname of the server 200. This DNS redirection may be statically configured in the DNS node 50, e.g., by the operator of the mobile communication network.

Also in this case the UE-specific configuration of the DNS redirection may for example be implemented by configuring the DNS node 50 to resolve the DNS queries for the hostname of the server 200 depending on a source address identifier in the DNS query. In this way, a DNS query which has a source address identifier corresponding to the network address of the UE 10 or being from the same address subrange as the network of the address of the UE 10 may be resolved in a different manner than other DNS queries. Further, the UE-specific configuration of the DNS redirection could be implemented by providing the DNS node with multiple network addresses and configuring the UE 10 to use a specific one of these network addresses for issuing DNS queries. The DNS node 50 may then resolve the DNS queries for the hostname of the server 200 depending on the network address on which the DNS query was received. The UE-specific configuration of the DNS redirection may also pertain to a group of UEs including the UE 10, e.g., a group of UEs for which a similar traffic handling policy is defined.

In the processes of FIG. 6, the NAT node 100 issues a first DNS query 601 to obtain the network address **200-*e* of the server 200. For example, the hostname of the server 200 may be configured in the NAT node 100 as a hostname associated with a certain traffic class, and the NAT node 100 may repeatedly issue DNS queries with this hostname, e.g., according to a periodic schedule. In this way, the NAT node 100 may obtain up-to date information on the network address 200-*e* currently assigned to the server 200**.

As illustrated, the DNS query 601 may be received by the DNS node 50, which then attempts to resolve the DNS query 601 by looking up entries for the hostname indicated in the DNS query 601. In the processes of FIG. 6, it is assumed that the DNS query 601 cannot be directly resolved by the DNS node 50, e.g., because for DNS queries from the NAT node 100 an entry for the hostname indicated in the DNS query 601 does not exist yet.

Accordingly, the DNS node 50 proceeds by issuing a further DNS query 602 with the hostname to the further DNS node 60. The further DNS node 60, which is a root DNS node, resolves the DNS query 602 with a network address of the further DNS node 70, which is authoritative for the domain of the server 200. The further DNS node 60 sends DNS response 603 to the DNS node 50. DNS response 603 indicates the network address of the further DNS node 70 to the DNS node 50.

The DNS node 50 may then issue a still further DNS query 604 to the further DNS node 70. The DNS node 70, which is authoritative for the domain of the server 200, resolves the DNS query 604 with the network address 200-*e* of the server 200. The further DNS node 70 sends DNS response 605 to the DNS node 50. DNS response 605 indicates the network address 200-*e* of the server 200 to the DNS node 50.

Having received DNS response 605, the DNS node 50 may cache a DNS entry which associates the hostname of the server 200 to the network address 200-*e* of the server 200. Further, the DNS node 50 sends a first DNS response 606 to the NAT node 100. The first DNS response 606 indicates the network address 200-*e* of the server 200 to the NAT node 100.

The NAT node 100 may then issue a second DNS query 607 to the DNS node 50. The second DNS query 607 is issued from the perspective of the UE 10. That is to say, depending on the implementation of the UE-specific DNS redirection, the second DNS query 607 may be sent with a source address identifier corresponding to the network address of the UE 10 or coming from the same address subrange, or the second DNS query 607 may be sent to a specific one of multiple network addresses of the DNS node 50, which would also be used by the UE 10 for issuing DNS queries. In other words, IP data packets used to send the DNS queries 601 and 607 may differ in either their source address identifier, their destination address identifier, or both.

In accordance with the configured UE-specific DNS redirection, the DNS node 50 resolves the second DNS query 607 with the replacement network address 200-*i*. The DNS node 50 sends a second DNS response 608 to the NAT node 100. The second DNS response 608 indicates the replacement network address 200-*i* to the NAT node 100.

At step 609, the NAT node 100 then maps the replacement network address 200-*i* as indicated in the second DNS response 608 to the network address 200-*e* of the server 200 as indicated in the first DNS response 606. This may for example involve creating an entry in a replacement table as illustrated in FIG. 2 or 3.

It should be understood that the issuing of further DNS queries to the further DNS nodes may be omitted in scenarios where the DNS node 50 already has a valid entry for resolving the initial DNS query with the network address of the server. Also, it should be understood that other procedures than the illustrated iterative lookup procedure might be used if the DNS node 50 is not able to resolve the initial DNS query with the network address of the server 200, e.g., a recursive lookup procedure or a combination of a recursive and iterative lookup procedure.

Figure 7:
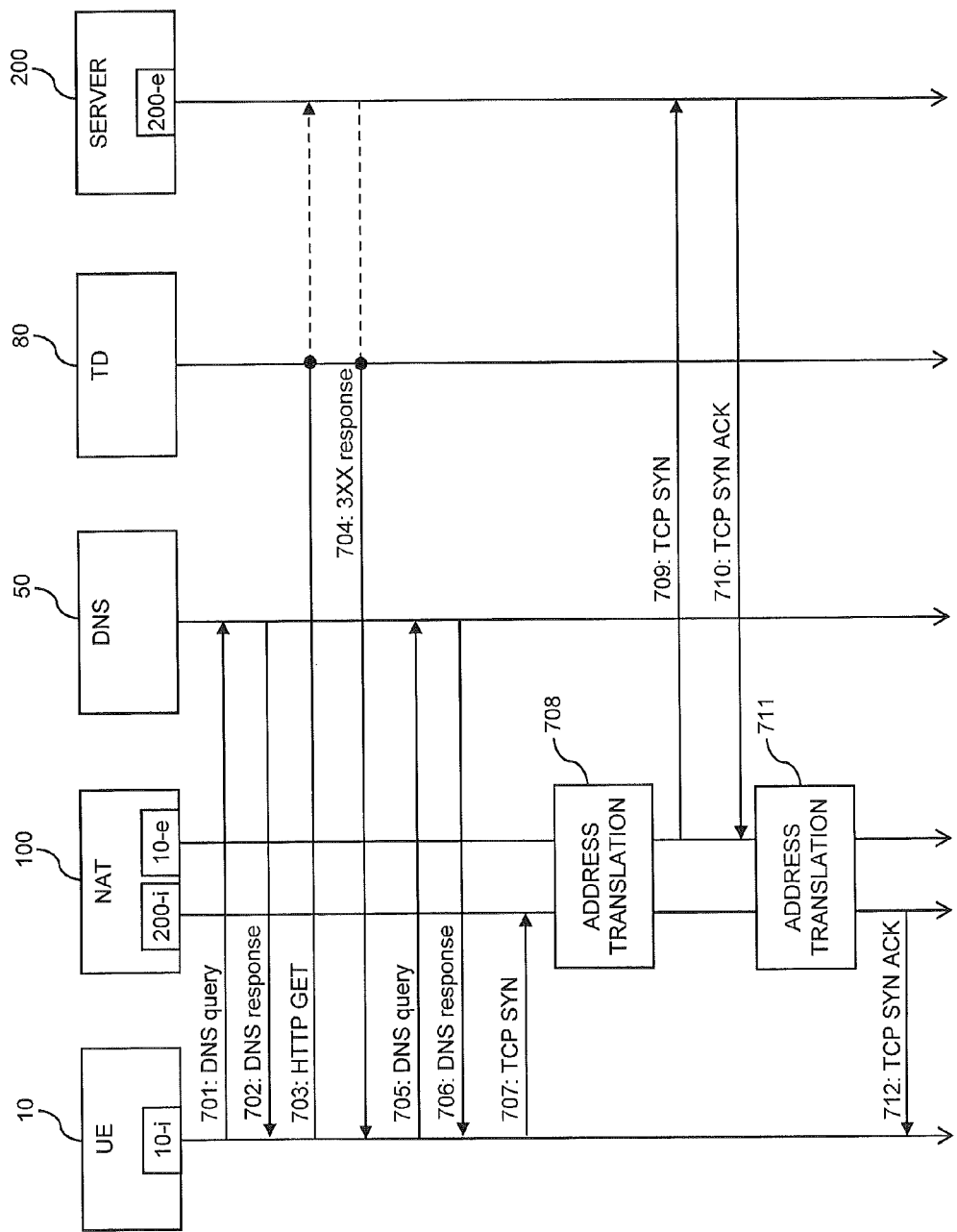
FIG. 7 illustrates an exemplary traffic classification process according to an embodiment of the invention.

FIG. 7 shows a signaling diagram for illustrating a further exemplary NAT assisted traffic classification process which is based on a HTTP redirection. The process involves the UE 10, the NAT node 100, a DNS node 50, a server 200, and a node 80 carrying user plane traffic between the UE 10 and the server. In the illustrated example, the node 80 is assumed to be a traffic detection (TD) node. The DNS node 50 may for example be a local DNS node hosted by the operator of the mobile communication network. The TD node 80 may for example use Deep Packet Inspection (DPI) or other traffic inspection techniques to analyze the data traffic of the UE 10. For example, the TD node 80 may be implemented in the gateway 26 or co-located with the gateway 26. The TD node 80 could also be co-located with the NAT node 100. The server 200 may for example provide store content which may be requested by users, e.g., media files, software, or the like.

As illustrated, a network address 10-*i* is assigned to the UE 10. The network address 10-*i* may be used for routing data packets to the UE 10. The network address 10-*i* of the UE 10 may be an IPv4 address or an IPv6 address. In the following, it is assumed that the network address 10-*i* of the UE 10 is a public network address. However, in some implementations, the network address 10-*i* could also be a private network address. In such implementations, an additional NAT instance could be used to translate the private address 10-*i* into a public address, e.g., between the TD node 80 and the server 200. Further, a network address 200-*e* is assigned to the server 200. The network address 200-*e* may be used for routing data packets to the server 200. The network address 200-*e* of the server 200 may be an IPv4 address or an IPv6 address. Also the network address 200-*e* is assumed to be a public network address.

In accordance with the concepts as outlined above, a replacement network address 200-*i* is mapped to the network address 200-*e* of the server 200. The replacement network address 200-*i* is assigned to an internal interface of the NAT node 100, i.e., data packets having a destination address identifier corresponding to the replacement network address 200-*i* will be routed to the internal interface of the NAT node 100. The replacement network address 200-*i* may be an IPv4 address or an IPv6 address. The replacement network address 200-*i* may be a private network address. In the latter case it may be suitable for routing data packets in only in a private network section extending from the internal interface of the NAT node 100. As further illustrated, a further replacement network address 10-*e* may be mapped to the network address 10-*i* of the UE 10. The further replacement network address 10-*e* is assigned to an external interface of the NAT node 100, i.e., data packets having a destination address identifier corresponding to the further replacement network address 10-*e* will be routed to the external interface of the NAT node 100. The further replacement network address 10-*e* may be an IPv4 address or an IPv6 address. Also the further replacement network address 10-*e* is assumed to be a public network address. The mapping of the replacement network address 200-*i* to the network address 200-*e* of the server 200 and the mapping of the further replacement network address 10-*e* to the network address of the UE 10 are configured in the NAT node 100, e.g., in the form of a replacement table as illustrated in FIG. 2 or 3. In some implementations, the network address 10-*i* of the UE 10 could also be used on the external side of the NAT node 100 to identify the UE 10, i.e., the network address 10-*i* of the UE 10 and the further replacement network address 10-*e* could be the same. In the latter case, the network address 10-*i*/10-*e* would not be assigned to the external interface of the NAT node 100, but the external interface of the NAT node 100 would correspond to one hop in a routing path between the network address 200-*e* and the network address 10-*i*/10-*e* assigned to the UE 10.

In the process of FIG. 7, the UE 10 may attempt establishment of a session with the server 200. For this purpose, the UE 10 may first send a DNS query 701 to the DNS node 50, which then attempts to resolve the DNS query 701 by looking up entries for a hostname of the server 200 as indicated in the DNS query 701. In the processes of FIG. 7, it is assumed that the DNS query 701 can be directly resolved by the DNS node 50, e.g., because for DNS queries from the UE 10 an entry for the hostname indicated in the DNS query 701 already exists in the DNS node 50. Having received DNS query 701, the DNS node 50 sends a DNS response 702 to the UE 10. The DNS response 702 indicates the network address 200-*e* of the server 200 to the UE 10.

The UE 10 then sends a HTTP GET message 703 toward the server 200. For this purpose, the UE 10 uses the network address 200-*e* of the server 200 as indicated in the DNS response 702.

The TD node 80 intercepts the HTTP GET message 703. For this purpose, the TD node 80 may analyze HTTP traffic from the UE 10 to detect a HTTP GET messages directed to the server 80. The TD node 80 then sends a HTTP 3XX response 704 to the UE 10. The HTTP 3XX response 704 is generated with a source address identifier corresponding to the network address 200-*e* of the server 200. Accordingly, the UE 10 will regard the HTTP 3XX response 704 as coming from the server 200. The HTTP 3XX response 704 indicates to the UE 10 that the object requested by the HTTP GET message 703 has moved to another location identified by a redirection Uniform Resource Locator (URL). The redirection URL may contain a new hostname that is different from the hostname of the server 200. In some implementations, the redirection URL may also include the replacement network address 200-*i* for the server 200.

If the redirection URL includes a new hostname of the server 200, the UE 10 may issue a further DNS query 705 with the new hostname to the DNS node 50. The DNS node 50 may in turn be configured with a DNS entry relating the new hostname to the replacement network address 200-*i*. Accordingly, the DNS node 50 resolves the DNS query 705 with the replacement network address 200-*i*.

Having resolved the DNS query 705, the DNS node 50 sends a DNS response 706 to the UE 10. The DNS response 706 indicates the replacement network address 200-*i* to the UE 10. Accordingly, the UE 10 will use the replacement network address 200-*i* in the destination address identifier of future UL data packets sent to the server 200.

If the redirection URL already includes the replacement network address 200-*i*, the DNS query 705 and DNS response 706 are not needed.

The UE 10 then newly attempts to establish a session with the server 200 by resending the HTTP GET message with the redirection URL to the replacement network address 200-*i* indicated in DNS response 706. Accordingly, the UE 10 sends a TCP SYN packet 707 to the replacement network address 200-*i*. The TCP SYN packet 705 may at the same time carry the resent HTTP GET message with the redirection URL. The TCP SYN packet 707 carries a destination address identifier corresponding to the replacement network address 200-*i* and a source address identifier corresponding to the network address 10-*i* of the UE 10.

The TCP SYN packet 707 is received at the internal interface of the NAT node 100. At step 708, the NAT node 100 performs NAT of the TCP SYN packet 707 in accordance with the mapping configured in the NAT node 100. This is accomplished by modifying the destination address identifier to correspond to the mapped network address 200-*e* of the server 200 and by modifying the source address identifier to correspond to the further replacement network address 10-*e* which is mapped to the network address of the UE 10. The translated TCP SYN packet 707 is then sent from the external interface of the NAT node 100.

As further illustrated, the server 200 receives the translated TCP SYN packet 709 and responds with a TCP SYN-ACK packet 710. In accordance with the usual TCP connection handshake procedure, the TCP SYN-ACK packet 710 carries a destination address identifier corresponding to the further replacement network address 10-*e* and a source address identifier corresponding to the network address 200-*e* of the server 200.

The TCP SYN-ACK packet 710 is received at the external interface of the NAT node 100. At step 711, the NAT node 100 performs NAT of the TCP SYN-ACK packet 710 in accordance with the mapping configured in the NAT node 100. This is accomplished by modifying the destination address identifier to correspond to the network address 10-*i* of the UE 10 and by modifying the source address identifier to correspond to the replacement network address 200-*i*. The translated TCP SYN-ACK packet 710 is then sent from the internal interface of the NAT node 100.

When the UE 10 receives the translated TCP SYN-ACK packet 712, the TCP connection handshake procedure is completed, and the UE 10 may continue with sending UL data packets to the server 200 and receiving DL data packets in response thereto, using the same destination address identifiers and source address identifiers as in the TCP SYN packet 707 and the translated TCP SYN-ACK packet 712. That is to say, further UL packets between UE 10 and server 200 are treated by the NAT node 100 in a similar way as TCP SYN packet 707, and further DL data packets between server 200 and UE 10 are treated in a similar way as TCP SYN-ACK packet 710. Accordingly, the replacement network address 200-*i* in these UL and DL data packets as transmitted between the UE 10 and the NAT node 100 may be efficiently used for traffic classification with one or more traffic classification rules matching the replacement network address 200-*i*, e.g., for directing the data packets to a certain bearer by using packet filters as explained in connection with FIG. 1.

Figure 8:
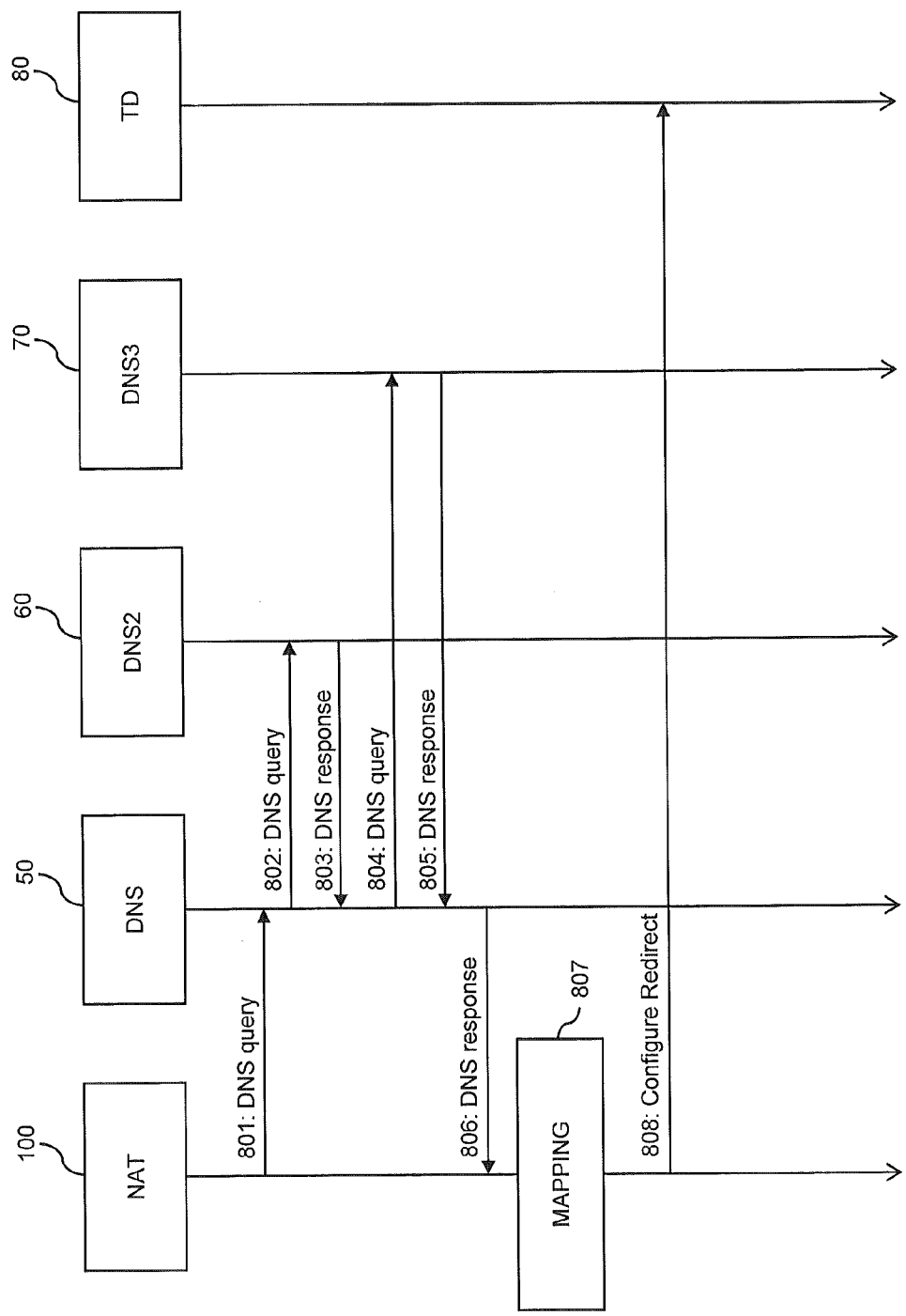
FIG. 8 illustrates exemplary processes according to an embodiment of the invention, which may be used in connection with the process of FIG. 7 for determining a mapping between a network address of a server and a replacement network address.

FIG. 8 shows a signaling diagram for illustrating exemplary processes for configuring the address mapping and HTTP redirection to be applied in a NAT assisted traffic classification process as for example explained in connection with FIG. 7. The processes of FIG. 8 involve the NAT node 100, the DNS node 50, further DNS nodes 60, 70, and the TD node 80. The further DNS node 60 is assumed to be a root DNS node, and the further DNS node 70 is assumed to be a DNS node which is authoritative for the domain of the server 200.

In the processes of FIG. 8, the NAT node 100 issues a DNS query 801 to obtain the network address 200-*e* of the server 200. For example, the hostname of the server 200 may be configured in the NAT node 100 as a hostname associated with a certain traffic class, and the NAT node 100 may repeatedly issue DNS queries with this hostname, e.g., according to a periodic schedule. In this way, the NAT node 100 may obtain up-to date information on the network address 200-*e* currently assigned to the server 200.

As illustrated, the DNS query 801 may be received by the DNS node 50, which then attempts to resolve the DNS query 801 by looking up entries for the hostname indicated in the DNS query 801. In the processes of FIG. 5, it is assumed that the DNS query 801 cannot be directly resolved by the DNS node 50, e.g., because an entry for the hostname indicated in the DNS query 801 does not exist yet.

Accordingly, the DNS node 50 proceeds by issuing a further DNS query 802 with the hostname to the further DNS node 60. The further DNS node 60, which is a root DNS node, resolves the DNS query 802 with a network address of the further DNS node 70, which is authoritative for the domain of the server 200. The further DNS node 60 sends DNS response 803 to the DNS node 50. DNS response 803 indicates the network address of the further DNS node 70 to the DNS node 50.

The DNS node 50 may then issue a still further DNS query 804 to the further DNS node 70. The DNS node 70, which is authoritative for the domain of the server 200, resolves the DNS query 804 with the network address 200-*e* of the server 200. The further DNS node 70 sends DNS response 805 to the DNS node 50. DNS response 805 indicates the network address 200-*e* of the server 200 to the DNS node 50.

Having received DNS response 805, the DNS node 50 may cache a DNS entry which associates the hostname to the network address 200-*e* of the server 200. Further, the DNS node 50 sends DNS response 806 to the NAT node 100. DNS response 806 indicates the network address 200-*e* of the server 200 to the NAT node 100.

The NAT node 100 may then suitably select the replacement network address 200-*i*, e.g., from a certain subrange or subnet, and map the replacement network address 200-*i* to the network address 200-*e* of the server 200, as indicated by step 807. This may for example involve creating an entry in a replacement table as illustrated in FIG. 2 or 3.

Further, the NAT node 100 sends configuration message 808 to the TD node 80, to configure the TD node 80 to perform the HTTP redirection to a redirection URL specifying a new hostname for which an entry related to the replacement network address 200-*i* is configured in the DNS node 50. Upon receiving the configuration message 808, the TD node 80 configures a corresponding HTTP redirection entry. In some implementations, the NAT node 100 may alternatively use the configuration message 808 to configure the TD node 80 to perform the HTTP redirection to a redirection URL including the replacement network address 200-*i*.

Figure 9:
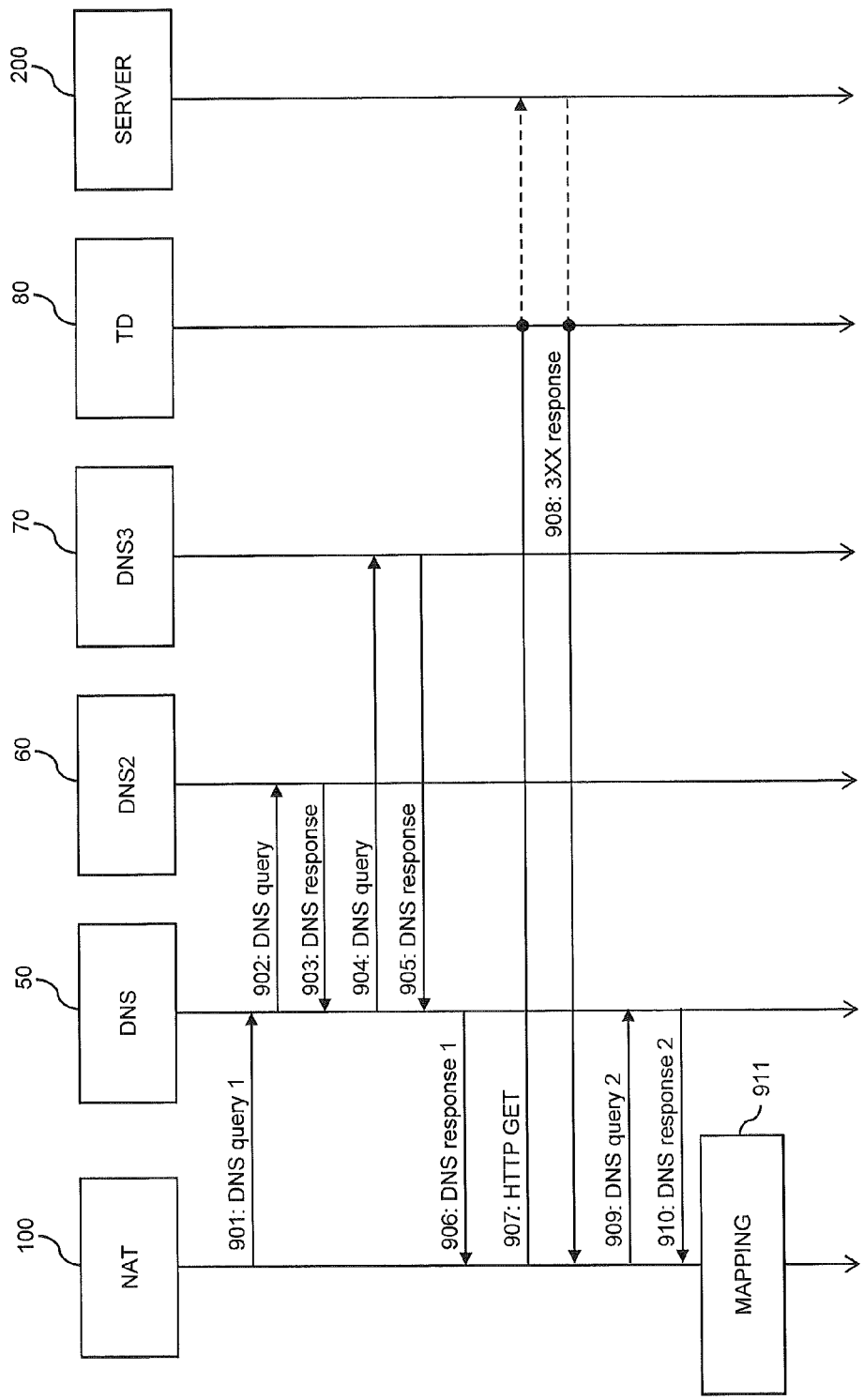
FIG. 9 illustrates further exemplary processes according to an embodiment of the invention, which may be used in connection with the process of FIG. 7 for determining a mapping between a network address of a server and a replacement network address.

FIG. 9 shows a signaling diagram for illustrating further exemplary processes for configuring the address mapping and HTTP redirection to be applied in a NAT assisted traffic classification process as for example explained in connection with FIG. 7. The processes of FIG. 9 involve the NAT node 100, the DNS node 50, further DNS nodes 60, 70, and the TD node 80. In addition, also the server 200 is illustrated. The further DNS node 60 is assumed to be a root DNS node, and the further DNS node 70 is assumed to be a DNS node which is authoritative for the domain of the server 200. Further, the TD node 80 is assumed to be already configured with a HTTP redirection for the server 200, which causes the TD node 80 to intercept HTTP GET messages to the server 200 and return HTTP 3XX responses indicating that the requested object has moved to another location identified by a redirection URL. This HTTP redirection may be statically configured in the TD node 80, e.g., by the operator of the mobile communication network.

In the processes of FIG. 9, the NAT node 100 issues a first DNS query 901 to obtain the network address 200-*e* of the server 200. For example, the hostname of the server 200 may be configured in the NAT node 100 as a hostname associated with a certain traffic class, and the NAT node 100 may repeatedly issue DNS queries with this hostname, e.g., according to a periodic schedule. In this way, the NAT node 100 may obtain up-to date information on the network address 200-*e* currently assigned to the server 200.

As illustrated, the DNS query 901 may be received by the DNS node 50, which then attempts to resolve the DNS query 901 by looking up entries for the hostname indicated in the DNS query 901. In the processes of FIG. 9, it is assumed that the DNS query 901 cannot be directly resolved by the DNS node 50, e.g., because for DNS queries from the NAT node 100 an entry for the hostname indicated in the DNS query 901 does not exist yet.

Accordingly, the DNS node 50 proceeds by issuing a further DNS query 902 with the hostname to the further DNS node 60. The further DNS node 60, which is a root DNS node, resolves the DNS query 902 with a network address of the further DNS node 70, which is authoritative for the domain of the server 200. The further DNS node 60 sends DNS response 903 to the DNS node 50. DNS response 903 indicates the network address of the further DNS node 70 to the DNS node 50.

The DNS node 50 may then issue a still further DNS query 904 to the further DNS node 70. The DNS node 70, which is authoritative for the domain of the server 200, resolves the DNS query 904 with the network address 200-*e* of the server 200. The further DNS node 70 sends DNS response 905 to the DNS node 50. DNS response 905 indicates the network address 200-*e* of the server 200 to the DNS node 50.

Having received DNS response 905, the DNS node 50 may cache a DNS entry which associates the hostname to the network address 200-*e* of the server 200. Further, the DNS node 50 sends a first DNS response 906 to the NAT node 100. The first DNS response 906 indicates the network address 200-*e* of the server 200 to the NAT node 100.

The NAT node 100 may then issue an HTTP GET message 907 to the network address 200-*e* of the server 200, which is intercepted by the TD node 80. According to the HTTP redirection configured in the TD node 80, the TD node 80 returns an HTTP 3XX response 908 to the NAT node 100. The HTTP 3XX response indicates the redirection URL configured in the HTTP redirection. The redirection URL may contain a new hostname that is different from the hostname of the server 200. In some implementations, the redirection URL may also contain the replacement network address 200-*i* for the server 200.

If the redirection URL includes a new hostname of the server 200, the NAT node 100 may issue a second DNS query 909 with the new hostname to the DNS node 50. The DNS node 50 may in turn be configured with a DNS entry which relates the new hostname to the replacement network address 200-*i*. Accordingly, the DNS node 50 resolves the second DNS query 909 with the replacement network address 200-*i*. The DNS node 50 sends a second DNS response 910 to the NAT node 100. The second DNS response 910 indicates the replacement network address 200-*i* to the NAT node 100.

If the redirection URL already includes the replacement network address 200-*i*, the second DNS query 909 and DNS response 910 are not needed.

At step 911, the NAT node 100 then maps the replacement network address 200-*i* as indicated in the second DNS response 910 to the network address 200-*e* of the server 200 as indicated in the first DNS response 906. This may for example involve creating an entry in a replacement table as illustrated in FIG. 2 or 3.

It should be understood that the issuing of further DNS queries to the further DNS nodes may be omitted in scenarios where the DNS node 50 already has a valid entry for resolving the initial DNS query with the network address of the server. Also, it should be understood that other procedures than the illustrated iterative lookup procedure might be used if the DNS node 50 is not able to resolve the initial DNS query with the network address of the server 200, e.g., a recursive lookup procedure or a combination of a recursive and iterative lookup procedure.

Figure 10:
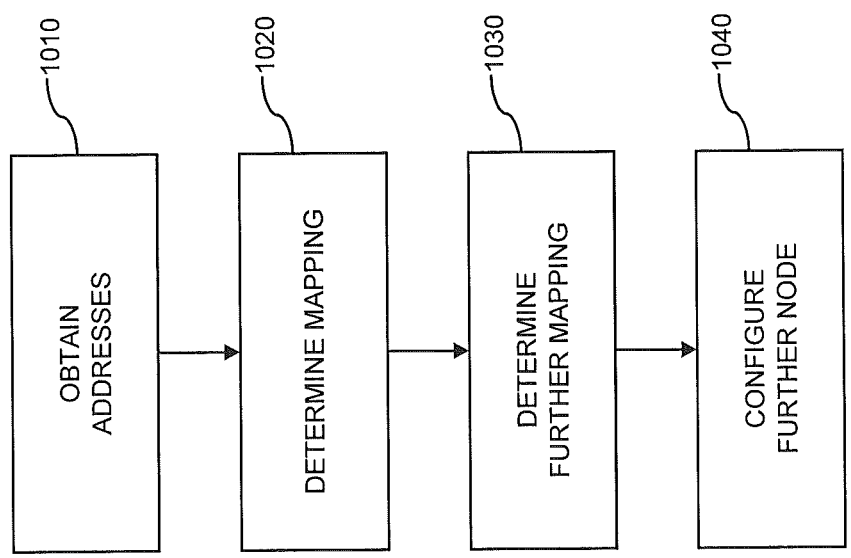
FIG. 10 shows a flowchart for illustrating a method according to an embodiment of the invention.

FIG. 10 shows a flowchart for schematically illustrating a method which may be used for implementing the above concepts in a node which performs NAT with the purpose of assisting in traffic classification, e.g., in the NAT node 100. The method specifically relates to the determination of the mapping between the network address of a server, e.g., the server 200, and a replacement network address to be used in UL data packets of user plane traffic sent from a UE to the server and typically also in DL data packets of the user plane traffic sent from the server to the UE. In the method of FIG. 10, a further node is configured to provide the replacement network address to the UE. This is accomplished by redirection of a query from the UE. The further node may be a DNS node such as the DNS node 50 and be configured to provide the replacement network address by DNS redirection, e.g., as in the processes of FIGS. 4 to 6. The further node may also be a node carrying the user plane traffic between the UE and the server and be configured to provide the replacement network address by HTTP redirection, e.g., as in the processes of FIGS. 7 to 9.

At step 1010, the node obtains addresses. In particular, the network address of the server and the replacement address may be obtained.

In some implementations, the node may issue a DNS query for the network address of the server and receive the network address of the server in a response to the DNS query. In addition the node may select the replacement network address in accordance with a traffic class of associated with the server, e.g., according to a rule relating the traffic class to a certain address subrange, e.g., as explained in connection with the exemplary processes of FIG. 5 or 8.

In further implementations, the node may issue a first DNS query for the network address of the server and receive the network address of the server in a first response to the first DNS query. In addition, the node may issue a second DNS query for the network address of the server and receive the replacement network address of the server in a second response to the second DNS query, e.g., as explained in connection with the exemplary process of FIG. 6.

The node may generate the first DNS query with a first source identifier and generate the second DNS query with a second source identifier which is different from the first source identifier. For example, the second source identifier may be a network address selected from the same address subrange as the network address of the UE or may even correspond to the network address of the UE. Alternatively, the node may generate the first DNS query with a first destination identifier and generate the second DNS query with a second destination identifier which is different from the first destination identifier. The first and second destination address identifiers may correspond to network addresses which are assigned to the same DNS node which uses different DNS entries depending on which network address the DNS query was received. The first and second destination address identifiers may also be associated with different DNS nodes.

In further implementations, if the further node is a node configured to provide the replacement network address by HTTP redirection, the node may issue a DNS query for the network address of the server and receive the network address of the server in a response to the DNS query. In addition, the node may issue a HTTP request toward the server and, in a response to the HTTP request, receive a redirection URL associated with the replacement network address. The node may then determine the replacement address from the redirection URL. The redirection URL may for example include the replacement network address. Alternatively, the redirection URL may include a new hostname for the server, which is associated with the replacement network address. The node may then issue a further DNS query for resolving the network address associated with the new hostname and, in a response to the further DNS query, receive the replacement network address.

At step 1020, the mapping between the network address of the server and the replacement network address is determined. In particular, the node may map the network address of the server as obtained at step 1010 to the replacement network address obtained at step 1020. This may involve creating an entry of a replacement table as for example illustrated in FIG. 2 or 3.

In some implementations, also a further mapping may be determined at step 1030. The further mapping maps a further replacement address to the network address of the UE. The further replacement address may have the purpose of routing certain DL data packets to the node so that the node can perform NAT on the DL data packets.

At step 1040, the node may configure the further node in accordance with the mapping as determined at step 1020, e.g., by sending a configuration message. For example, if the further node is a DNS node, it may be configured to perform a DNS redirection to resolve a DNS query for the network address of the server with the replacement network address. If the further node is a node carrying the user plane traffic between the UE and the server, it may be configured to perform a HTTP redirection of a HTTP request to a redirection URL associated with the replacement network address. The redirection URL may include a new hostname for the server which is related by a DNS entry to the replacement network address. Alternatively, the redirection URL may also include the replacement network address. Examples of processes in which the further node is dynamically configured depending on the mapping are explained in connection with FIGS. 5 and 8. Alternatively, a substantially static configuration of the further node could be used, e.g., as explained in connection with FIGS. 6 and 9.

Figure 11:
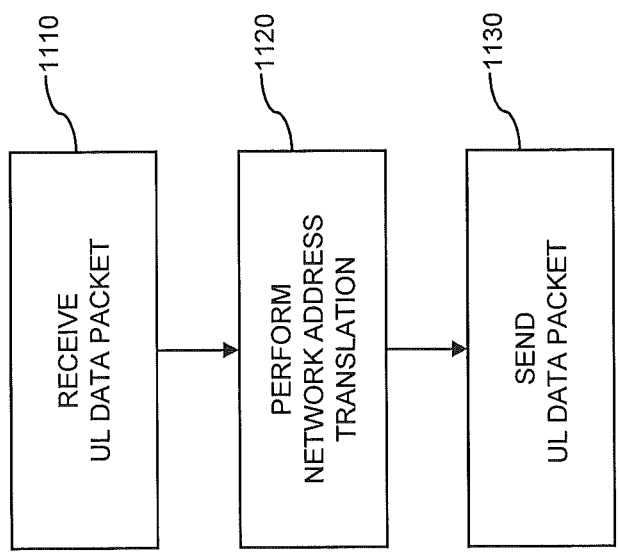
FIG. 11 shows a flowchart for illustrating a further method according to an embodiment of the invention.

FIG. 11 shows a flowchart for illustrating a method which may be performed by the node for handling the UL user plane traffic, using NAT on the basis the mapping as determined in the method of FIG. 10. In some implementations, the NAT may also be based on the further mapping as determined in step 1030 of FIG. 10.

At step 1110, the node receives an UL data packet of the user plane data traffic. The UL data packet is transmitted from the UE 10. A source address identifier in the UL data packet corresponds to a network address of the UE, and a destination address identifier in the UL data packet corresponds to the replacement network address.

At step 1120, the node performs NAT of the received UL data packet in accordance with the mapping determined in step 1020 of FIG. 10. This is accomplished by modifying the destination address identifier in the UL data packet to correspond to the network address of the server.

In some implementations, the node may also perform NAT of the received UL data packet in accordance with the further mapping determined in step 1030 of FIG. 10. This is accomplished by modifying the source address identifier in the UL data packet to correspond to the further replacement network address.

At step 1130, after the NAT of the UL data packet, the node sends the modified UL data packet toward the server.

Figure 12:
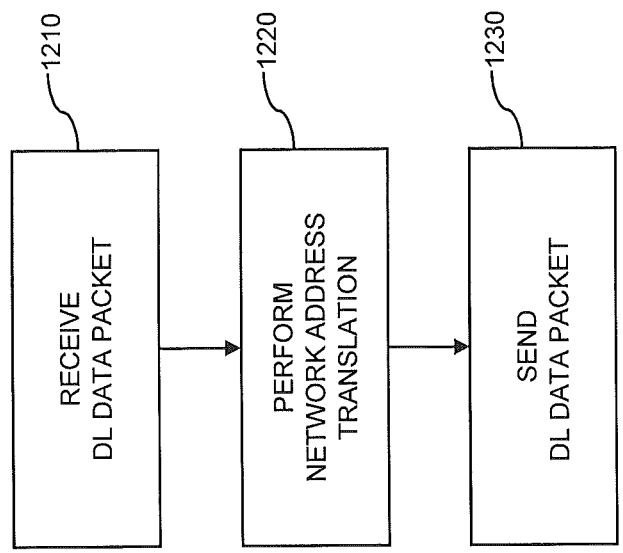
FIG. 12 shows a flowchart for illustrating a further method according to an embodiment of the invention.

FIG. 12 shows a flowchart for illustrating a method which may be additionally performed by the node for handling the DL user plane traffic, using NAT on the basis the mapping and the further mapping as determined in the method of FIG. 10.

As illustrated by step 1210, the node may also receive a DL data packet of the user plane data traffic. The DL data packet is destined to the UE. A source address identifier in the DL data packet corresponds to the network address of the server, and a destination address identifier in the DL data packet corresponds to the further replacement network address according to the further mapping determined in step 1030 of FIG. 10.

At step 1220, the node performs NAT of the received DL data packet in accordance with the mapping determined in step 1020 of FIG. 10 and in accordance with the further mapping determined in step 1030 of FIG. 10. This is accomplished by modifying the source address identifier in the DL data packet to correspond to the replacement network address and by modifying the destination address identifier to correspond to the network address of the UE.

At step 1230, after the NAT of the DL data packet, the node sends the modified DL data packet toward the UE.

The methods of FIGS. 10 to 12 may also be implemented by a system which includes at least the node performing the NAT and the further node performing the redirection of the query from the UE. The system may also include one or more nodes implementing a traffic classification rule operating on the basis of the replacement network address. For example such nodes may correspond to a UE which is provided with an UL packet filter operating on the basis of the replacement network address and/or to a gateway which is provided with an DL packet filter operating on the basis of the replacement network address, e.g., as explained above for the UE 10 and the gateway 26.

FIG. 13 further illustrates an exemplary implementation of a NAT node configured to operate in accordance with the above concepts. For example, the illustrated NAT node may implement the above described functionalities of the NAT node 100.

In the illustrated implementation, the NAT node includes an internal interface 120 for coupling to a UE, e.g., to the UE 10. The internal interface 120 may be configured to receive UL data packets of UL user plane traffic coming from the UE and to forward DL data packets of the DL user plane traffic to the UE. Accordingly, the internal interface 120 may be a bidirectional interface. However, in some implementations, if the traffic NAT node is configured for translation of UL traffic only, the internal interface 120 may be a unidirectional interface for receiving the UL traffic coming from the UE. Further, the NAT node includes an external interface 130 for coupling to a server, e.g., to the server 200. The external interface 130 may be configured to receive DL data packets of the DL user plane traffic to be transmitted to the UE and to forward UL data packets of the UL user plane traffic coming from the UE. Accordingly, the external interface 130 may be a bidirectional interface. However, in some implementations, if the NAT node is configured for adaptation of UL traffic only, the external interface 130 may be a unidirectional interface for forwarding the UL traffic from the UE.

Moreover, the traffic NAT node may also be provided with a control interface 140, which can be used to provide indications to other entities, e.g., to initiate generation of packet filters by signaling to the policy controller 30 and/or to the gateway 26, and/or to send configuration messages for configuring a further node to perform a redirection of a query from the UE. The control interface 140 could also be used to initiate control processes with respect to forwarding procedures of data packets, e.g., modification and/or establishment of the bearers 52, 54. Further, the control interface 140 may also be used to obtain traffic class rule data to be used for selecting a replacement network address in accordance with a certain traffic class or server data defining which server(s) are assigned to a given traffic class.

Further, the NAT node includes one or more processors 150 coupled to the interfaces 120, 130, 140 and a memory 160 coupled to the processor 150. The memory 160 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the NAT node. More specifically, the memory 160 may include an address determination module 170 so as to implement the above-described functionalities of obtaining network addresses or replacement network addresses, e.g., using DNS queries and/or a HTTP requests. Further, the memory 160 may include a mapping module so as to implement the above-described functionalities of mapping replacement addresses to network addresses. Further, the memory 160 may include mapping data 185, e.g., stored in the form of a replacement table as illustrated in FIG. 2 or 3. The mapping data 185 may be determined by the mapping module 170. Further, a part of the mapping data 185 may also be preconfigured. Still further, the memory 160 may include a NAT module 190 so as to implement the above-described NAT functionalities.

It is to be understood that the structure as illustrated in FIG. 13 is merely schematic and that the NAT node may actually include further components which, for the sake of clarity, have not been illustrated, e.g., further interfaces. Also, it is to be understood that the memory 160 may include further types of program code modules, which have not been illustrated, e.g., known NAT functionalities. According to some implementations, also a computer program product may be provided for implementing concepts as described herein, e.g., in the form of a computer-readable medium including program code to be stored in the memory 160, e.g., program code for implementing one or more of the above-mentioned program code modules 170, 180 and 190.

As can be seen, the concepts as explained above may be used for efficiently implementing NAT assisted traffic classification in a communication network. Specifically, a mapping of a replacement network address to be used for the NAT may be determined in such a way that a UE may use the correct replacement network address already in the first UL data packet of a session initiated by the UE. At the same time, excessive resource usage for processing data traffic may be avoided.

It is to be understood that the examples and embodiments as explained above are merely illustrative and susceptible to various modifications. For example, the concepts could be used in various types of communication networks using network address based traffic classification rules. In such other types of communication networks, other mechanisms than bearer assignments may be used for adapting the QoS level. For example, in a general IP based network Differentiated Services Code Point Fields of the data packets could be set in order to adapt the QoS level. Also, the concepts may be applied to any number of different traffic classes. Further, differentiated handling may not only be performed with respect to QoS, but also with respect to charging, gating, or redirection of data packets. Also the illustrated nodes may be implemented in various ways, e.g., by a single device or by multiple devices, e.g., a device cloud. Further, it is to be understood that the above concepts may be implemented by using correspondingly designed software in existing network devices, or by using dedicated network device hardware.

The invention claimed is:

1. A method of handling user plane traffic in a communication network, the method comprising:
    determining by a first node of the communication network a first mapping between a network address of a server and a first replacement network address matching a packet classification rule implemented in the communication network,
    performing by a second node of the communication network redirection of a query from a user equipment to provide the user equipment with the first replacement network address;
    receiving by the first node an uplink data packet of the user plane data traffic, a source address identifier in the uplink data packet corresponding to a network address of the user equipment, and a destination address identifier in the uplink data packet corresponding to the first replacement network address;

performing according to the first mapping, by the first node, network address translation of the received uplink data packet by modifying the destination address identifier in the uplink data packet to correspond to the first network address of the server;

after said network address translation of the uplink data packet, sending by the first node the modified uplink data packet toward the server, wherein the second node is a Domain Name System node;

issuing by the first node a Domain Name System query for the network address of the server and receiving the network address of the server in a response to the Domain Name System query;

determining by the first node the first mapping by selecting the first replacement network address in accordance with a traffic class of associated with the server and mapping the selected first replacement network address to the received network address of the network node; and indicating by the first node the first replacement network address to the second node for configuring the second node to resolve a Domain Name System query, issued by the user equipment to obtain the network address of the server, with the first replacement network address.

2. The method according to claim 1, comprising:
determining by the first node a second mapping between a network address of the user equipment and a second replacement network address;
performing according to the second mapping, by the first node, said network address translation of the received uplink data packet by further modifying the source address identifier in the received uplink data packet to correspond to the second replacement network address.

3. The method according to claim 2, comprising:
receiving by the first node a downlink data packet of the user plane data traffic, a source address identifier in the downlink data packet corresponding to the network address of the server, and a destination address identifier in the downlink data packet corresponding to the second replacement network address;
performing according to the first mapping and the second mapping, by the first node, network address translation of the received downlink data packet by modifying the source address identifier in the downlink data packet to correspond to the first replacement network address and by modifying the destination address identifier in the downlink data packet to correspond to the network address of the user equipment; and
sending by the first node the modified downlink data packet toward the user equipment.

4. The method according to claim 1, comprising:
issuing by the first node a first Domain Name System query for the network address of the server and receiving the network address of the server in a response to the first Domain Name System query;
issuing by the first node a second Domain Name System query for the network address of the server and receiving the first replacement network address in response to the second Domain Name System query; and
determining by the first node the first mapping by mapping the received network address of the server to the received first replacement network address.

5. The method according to claim 4,
wherein the first node generates the first Domain Name System query with a first source identifier and generates the second Domain Name System query with a second source identifier which is different from the first source identifier.

6. The method according to claim 4,
wherein the first node generates the first Domain Name System query with a first destination identifier and generates the second Domain Name System query with a second destination identifier which is different from the first destination identifier.

7. A method of handling user plane traffic in a communication network, the method comprising:
determining by a first node of the communication network a first mapping between a network address of a server and a first replacement network address matching a packet classification rule implemented in the communication network,
performing by a second node of the communication network redirection of a query from a user equipment to provide the user equipment with the first replacement network address;
receiving by the first node an uplink data packet of the user plane data traffic a source address identifier in the uplink data packet corresponding to a network address of the user equipment, and a destination address identifier in the uplink data packet corresponding to the first replacement network address;
performing according to the first mapping, by the first node, network address translation of the received uplink data packet by modifying the destination address identifier in the uplink data packet to correspond to the first network address of the server; and
after said network address translation of the unlink data packet, sending by the first node the modified uplink data packet toward the server,
wherein the second node is a node carrying the user plane traffic between the user equipment and the server, the second node performing a Hypertext Transfer Protocol redirection of a Hypertext Transfer Protocol request to the server to a redirection Uniform Resource Locator associated with the first replacement network address.

8. The method according to claim 7, comprising:
issuing by the first node a Domain Name System query for the network address of the server and receiving the network address of the server in a response to the first Domain Name System query;
determining by the first node the first mapping by selecting the first replacement network address in accordance with a traffic class associated with the server and mapping the selected first replacement network address to the received network address of the server; and
indicating by the first node the redirection Uniform Resource Locator associated with the first replacement network address to the second node for configuring the second node to perform the Hypertext Transfer Protocol redirection.

9. The method according to claim 7, comprising:
issuing by the first node a Domain Name System query for the network address of the server and receiving the network address of the server in a response to the Domain Name System query;
issuing by the first node a Hypertext Transfer Protocol request toward the server and in a response to the Hypertext Transfer Protocol request, receiving the redirection Uniform Resource Locator associated with the first replacement network address;

determining by the first node the first replacement network address from the redirection Uniform Resource Locator; and determining by the first node the first mapping by mapping the received network address of the server to the determined first replacement network address.

10. A node for handling user plane traffic in a communication network, comprising:

at least one processor, a first interface for coupling to a user equipment, and a second interface for coupling to a server, wherein the at least one processor is configured to:

determine a first mapping between a network address of a server and a first replacement network address matching a packet classification rule implemented in the communication network, via the first interface, receive an uplink data packet of the user plane data traffic, a source address identifier in the uplink data packet corresponding to a network address of the user equipment, and a destination address identifier in the uplink data packet corresponding to the first replacement network address, according to the first mapping, perform network address translation of the received uplink data packet by modifying the destination address identifier in the uplink data packet to correspond to the network address of the server, send the modified uplink data packet via the second interface toward the server, determine a second mapping between a network address of the user equipment and a second replacement network address, and perform according to the second mapping said network address translation of the received uplink data packet by further modifying the source address identifier in the received uplink data packet to correspond to the second replacement network address.

11. A system for handling user plane traffic in a communication network, the system comprising:

a first node and a second node, wherein the first node is configured to:

determine a first mapping between a network address of a server and a first replacement network address matching a packet classification rule implemented in the communication network;

receive an uplink data packet of the user plane data traffic, a source address identifier in the uplink data packet corresponding to a network address of a user equipment, and a destination address identifier in the uplink data packet corresponding to the first replacement network address;

according to the first mapping, perform network address translation of the received uplink data packet by modifying the destination address identifier in the uplink data packet to correspond to the network address of the server;

send the modified uplink data packet toward the server, wherein the second node is configured to perform redirection of a query from the user equipment to provide the user equipment with the first replacement network address, and wherein the second node is a Domain Name System node;

issuing by the first node a Domain Name System query for the network address of the server and receiving the network address of the server in a response to the Domain Name System query;

determining by the first node the first mapping by selecting the first replacement network address in accordance with a traffic class associated with the server and mapping the selected first replacement network address to the received network address of the network node; and indicating by the first node the first replacement network address to the second node for configuring the second node to resolve a Domain Name System query, issued by the user equipment to obtain the network address of the server, with the first replacement network address.

12. The system according to claim 11, wherein the node is configured to:

determine a second mapping between a network address of the user equipment and a second replacement network address;

perform according to the second mapping said network address translation of the received uplink data packet by further modifying the source address identifier in the received uplink data packet to correspond to the second replacement network address.

13. A computer program product comprising program code stored on a non-transitory computer-readable medium to be executed by a processor of a first node of a communication network, thereby causing the first node to operate in accordance with a method as defined by claim 1.

14. The node of claim 10, wherein the node is a first node, and wherein a second node of the communication network is configured to perform redirection of a query from the user equipment to provide the user equipment with the replacement network address.

15. The system according to claim 11, wherein the Domain Name System query is a first Domain Name System query, and further comprising:

issuing by the first node a second Domain Name System query for the network address of the server and receiving the first replacement network address in response to the second Domain Name System query; and determining by the first node the first mapping by mapping the received network address of the server to the received first replacement network address.

16. The system according to claim 15, wherein the first node generates the first Domain Name System query with a first source identifier and generates the second Domain Name System query with a second source identifier which is different from the first source identifier.

17. The system according to claim 15, wherein the first node generates the first Domain Name System query with a first destination identifier and generates the second Domain Name System query with a second destination identifier which is different from the first destination identifier.

18. A system for handling user plane traffic in a communication network, the system comprising:

a first node and a second node, wherein the first node is configured to:

determine a first mapping between a network address of a server and a first replacement network address matching a packet classification rule implemented in the communication network;

receive an uplink data packet of the user plane data traffic, a source address identifier in the uplink data packet corresponding to a network address of a user equipment, and a destination address identifier in the uplink data packet corresponding to the first replacement network address;

according to the first mapping, perform network address translation of the received uplink data packet by modifying the destination address identifier in the uplink data packet to correspond to the network address of the server; and send the modified uplink data packet toward the server, wherein the second node is configured to perform redirection of a query from the user equipment to provide the user equipment with the first replacement network address, and wherein the second node is a node carrying the user plane traffic between the user equipment and the server, the second node performing a Hypertext Transfer Protocol redirection of a Hypertext Transfer Protocol request to the server to a redirection Uniform Resource Locator associated with the first replacement network address.

19. The system according to claim 18, comprising:

issuing by the first node a Domain Name System query for the network address of the server and receiving the network address of the server in a response to the first Domain Name System query;

determining by the first node the first mapping by selecting the first replacement network address in accordance with a traffic class associated with the server and mapping the selected first replacement network address to the received network address of the server; and indicating by the first node the redirection Uniform Resource Locator associated with the first replacement network address to the second node for configuring the second node to perform the Hypertext Transfer Protocol redirection.

20. The system according to claim 18, comprising:

issuing by the first node a Domain Name System query for the network address of the server and receiving the network address of the server in a response to the Domain Name System query;

issuing by the first node a Hypertext Transfer Protocol request toward the server and, in a response to the Hypertext Transfer Protocol request, receiving the redirection Uniform Resource Locator associated with the first replacement network address;

determining by the first node the first replacement network address from the redirection Uniform Resource Locator; and determining by the first node the first mapping by mapping the received network address of the server to the determined first replacement network address.

* * * * *